US009824409B2

(12) United States Patent
Katayama et al.

(10) Patent No.: US 9,824,409 B2
(45) Date of Patent: Nov. 21, 2017

(54) ENERGY MANAGEMENT SYSTEM, SERVER, ENERGY MANAGEMENT METHOD, AND STORAGE MEDIUM

(71) Applicant: Kabushiki Kaisha Toshiba, Minato-ku (JP)

(72) Inventors: Kyosuke Katayama, Asaka (JP);
Tomohiko Tanimoto, Tama (JP);
Kazuto Kubota, Kawasaki (JP);
Takahisa Wada, Yokohama (JP);
Kiyotaka Matsue, Kawasaki (JP);
Hiroshi Taira, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 843 days.

(21) Appl. No.: 14/163,866

(22) Filed: Jan. 24, 2014

(65) Prior Publication Data
US 2014/0142774 A1 May 22, 2014

Related U.S. Application Data

(63) Continuation of application No. PCT/JP2013/071266, filed on Aug. 6, 2013.

(30) Foreign Application Priority Data

Sep. 3, 2012 (JP) .................................. 2012-193101
Nov. 7, 2012 (JP) .................................. 2012-245581

(51) Int. Cl.
*G06Q 50/06* (2012.01)
*H02J 3/32* (2006.01)
(Continued)

(52) U.S. Cl.
CPC .......... *G06Q 50/06* (2013.01); *B60L 11/1824* (2013.01); *B60L 11/1842* (2013.01);
(Continued)

(58) Field of Classification Search
CPC .... G06Q 50/06; G06Q 10/00; B60L 11/1848; B60L 11/1844; B60L 11/1824;
(Continued)

(56) References Cited

U.S. PATENT DOCUMENTS 7,430,545 B2 * 9/2008 Kanbara ................ G06Q 30/00
700/291
9,037,307 B2 * 5/2015 Kaji .......................... H02J 3/14
700/291
(Continued)

FOREIGN PATENT DOCUMENTS

JP 2002-048005 A 2/2002
JP 2002-230099 A 8/2002
(Continued)

OTHER PUBLICATIONS

Office Action dated May 31, 2016 in Japanese Patent Application No. 2012-245581 (with English language translation).
(Continued)

*Primary Examiner* — Charles Kasenge
(74) *Attorney, Agent, or Firm* — Oblon, McClelland, Maier & Neustadt, L.L.P.

(57) ABSTRACT

According to an embodiment, energy management system includes client and server. Server includes acquisition unit, estimation unit, calculator and controller. Acquisition unit acquires data concerning electrical equipment in a building including a storage battery from client. Estimation unit estimates energy demand and energy generation amount in building based on the data. Calculator calculates, based on the energy demand and the energy generation amount, operation schedule of the electrical equipment to optimize energy balance in building under a constraint that minimizes dump power to be discarded after storage battery is fully
(Continued)

charged. Controller creates control information to control electrical equipment based on operation schedule.

19 Claims, 18 Drawing Sheets

(51) Int. Cl.
| | | |
|---|---|---|
| B60L 11/18 | (2006.01) | |
| H02J 3/14 | (2006.01) | |
| H02J 13/00 | (2006.01) | |
| G06Q 10/00 | (2012.01) | |
| H02J 3/38 | (2006.01) | |

(52) U.S. Cl.
CPC ....... *B60L 11/1844* (2013.01); *B60L 11/1848* (2013.01); *G06Q 10/00* (2013.01); *H02J 3/14* (2013.01); *H02J 3/32* (2013.01); *H02J 13/0062* (2013.01); *B60L 2230/16* (2013.01); *B60L 2240/70* (2013.01); *B60L 2250/14* (2013.01); *H02J 3/383* (2013.01); *H02J 3/386* (2013.01); *H02J 3/387* (2013.01); *H02J 2003/143* (2013.01); *Y02B 10/14* (2013.01); *Y02B 70/3225* (2013.01); *Y02B 70/3266* (2013.01); *Y02B 90/2638* (2013.01); *Y02E 10/563* (2013.01); *Y02E 10/763* (2013.01); *Y02E 60/721* (2013.01); *Y02E 70/30* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 20/222* (2013.01); *Y04S 20/242* (2013.01); *Y04S 30/14* (2013.01); *Y04S 40/124* (2013.01)

(58) Field of Classification Search
CPC .............. B60L 11/1842; B60L 2250/14; B60L 2240/70; B60L 2230/16; H02J 3/14; H02J 13/0062; H02J 3/32; H02J 3/383; H02J 2003/143; H02J 3/387; H02J 3/386; Y02T 10/7005; Y02T 90/14; Y02T 90/163; Y02T 10/7088; Y02T 90/128; Y02T 90/169; Y02T 10/7291; Y02T 90/121; Y02T 90/16; Y02E 10/563; Y02E 10/763; Y02E 60/721; Y02E 70/30; Y02B 90/2638; Y02B 70/3225; Y02B 70/3266; Y04S 20/222; Y04S 20/242; Y04S 30/14; Y04S 40/124; Y04S 10/126
See application file for complete search history.

(56) References Cited

U.S. PATENT DOCUMENTS

| | | | | |
|---|---|---|---|---|
| 2011/0121779 A1* | 5/2011 | Ichikawa | ............ | B60L 11/1816 320/109 |
| 2011/0133688 A1* | 6/2011 | Ishibashi | ............. | B60L 11/1809 320/101 |
| 2011/0183733 A1* | 7/2011 | Yoshida | ................... | H04L 12/10 463/1 |
| 2011/0184575 A1* | 7/2011 | Kawamoto | ............ | G06Q 50/06 700/292 |
| 2011/0184580 A1* | 7/2011 | Kawamoto | ............... | H02J 3/14 700/295 |
| 2011/0184585 A1* | 7/2011 | Matsuda | .................... | G06F 1/26 700/297 |
| 2011/0184586 A1* | 7/2011 | Asano | .................... | G05B 15/02 700/297 |
| 2011/0185196 A1* | 7/2011 | Asano | ................. | B60L 11/1809 713/300 |
| 2011/0204720 A1* | 8/2011 | Ruiz | ................... | B60L 11/1816 307/66 |
| 2011/0270452 A1* | 11/2011 | Lu | ........................ | G05B 19/042 700/291 |
| 2012/0072040 A1* | 3/2012 | Kaji | ......................... | H02J 3/14 700/291 |
| 2012/0086397 A1* | 4/2012 | Obayashi | .................. | H02J 3/32 320/109 |
| 2012/0098488 A1* | 4/2012 | Ichikawa | ............ | B60L 11/1816 320/109 |
| 2012/0203387 A1 | 8/2012 | Takayama et al. | | |
| 2012/0288016 A1* | 11/2012 | Ichikawa | ............ | B60L 11/1824 375/257 |
| 2012/0295547 A1* | 11/2012 | Ichikawa | ............ | B60L 11/1824 455/66.1 |
| 2012/0323386 A1* | 12/2012 | Ito | ............................. | H02J 3/32 700/291 |
| 2013/0013123 A1* | 1/2013 | Ozaki | ................. | B60L 11/1842 700/295 |
| 2014/0018969 A1* | 1/2014 | Forbes, Jr. | ................. | H02J 3/32 700/295 |
| 2014/0039699 A1* | 2/2014 | Forbes, Jr. | ............. | G05B 19/02 700/286 |
| 2014/0039701 A1* | 2/2014 | Forbes, Jr. | ............. | G05B 19/02 700/286 |
| 2014/0039703 A1* | 2/2014 | Forbes, Jr. | ............. | G05B 19/02 700/286 |

FOREIGN PATENT DOCUMENTS

| | | | |
|---|---|---|---|
| JP | 2005-304118 | A | 10/2005 |
| JP | 2006-296097 | A | 10/2006 |
| JP | 2008-289276 | A | 11/2008 |
| JP | 2010-124644 | A | 6/2010 |
| JP | 2010-273407 | A | 12/2010 |
| JP | 2011-155711 | A | 8/2011 |
| JP | 2011-181377 | A | 9/2011 |
| JP | 2012-085406 | A | 4/2012 |
| JP | 2012-120295 | A | 6/2012 |
| JP | 2012-157106 | A | 8/2012 |
| JP | 2013-523060 | A | 6/2013 |
| WO | WO 2011/030195 | A1 | 3/2011 |
| WO | WO 2011/086886 | A1 | 7/2011 |
| WO | WO 2011/106917 | A1 | 9/2011 |

OTHER PUBLICATIONS

Office Action dated Dec. 22, 2015 in Japanese Patent Application No. 2012-193101 (with English language translation).
Japanese Office Action dated Jan. 19, 2016 in Patent Application No. 2012-245581 (with English language translation).
Extended European Search Report dated Mar. 3, 2016 in Patent Application No. 13831814.2.
International Search Report dated Oct. 1, 2013 in PCT/JP2013/071266 (Japanese version of the International Search Report was filed on Jan. 24, 2014 submitting English translation only).
Office Action dated Jun. 2, 2015 in Japanese Patent Application No. 2012-193101 (with English language translation).
International Search Report dated Oct. 1, 2013 for PCT/JP2013/071266 filed on Aug. 6, 2013 with English Translation of Categories.
International Written Opinion dated Oct. 1, 2013 for PCT/JP2013/071266 filed on Aug. 6, 2013.

* cited by examiner

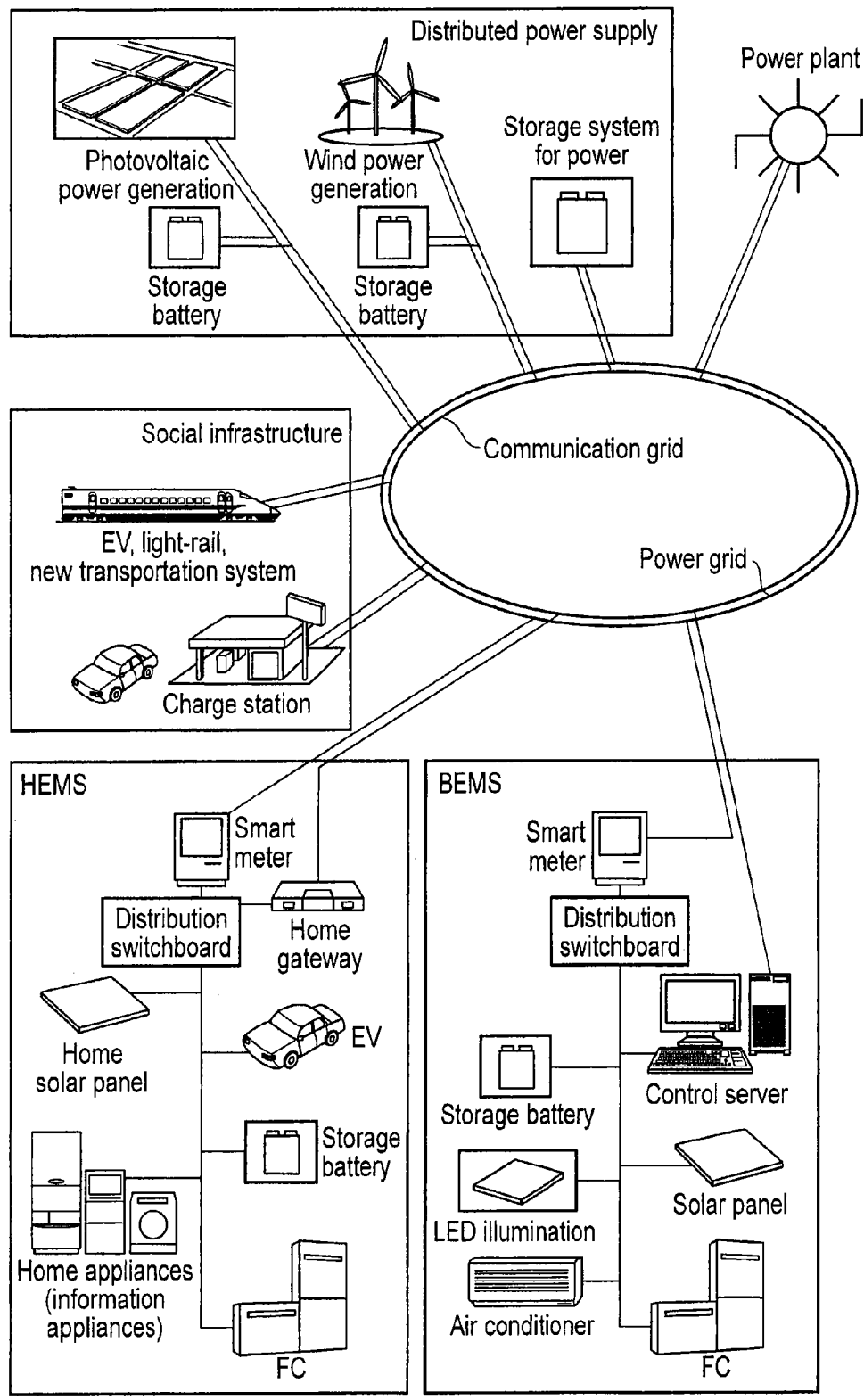
F I G. 1

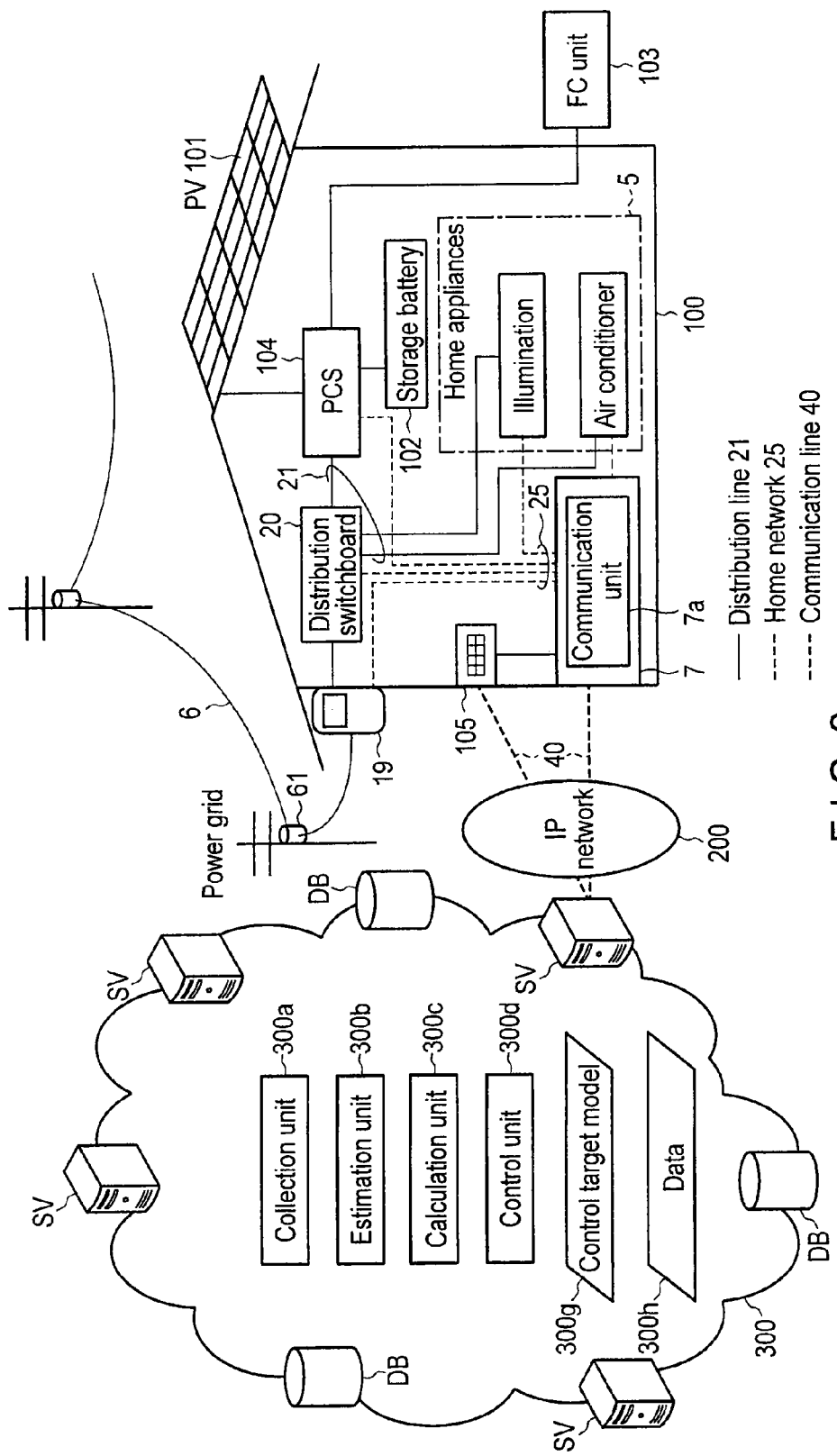
F I G. 2

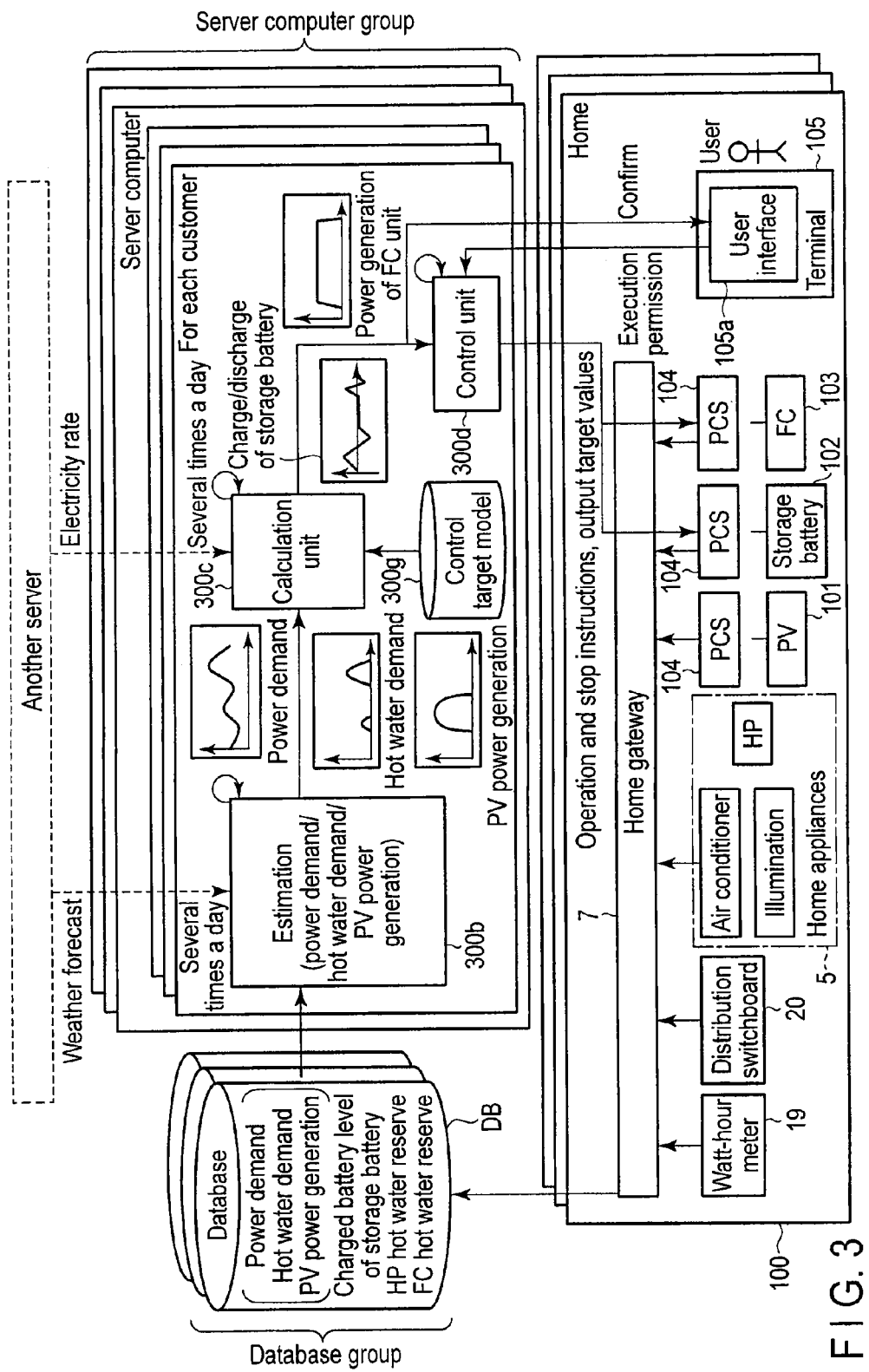
F I G. 3

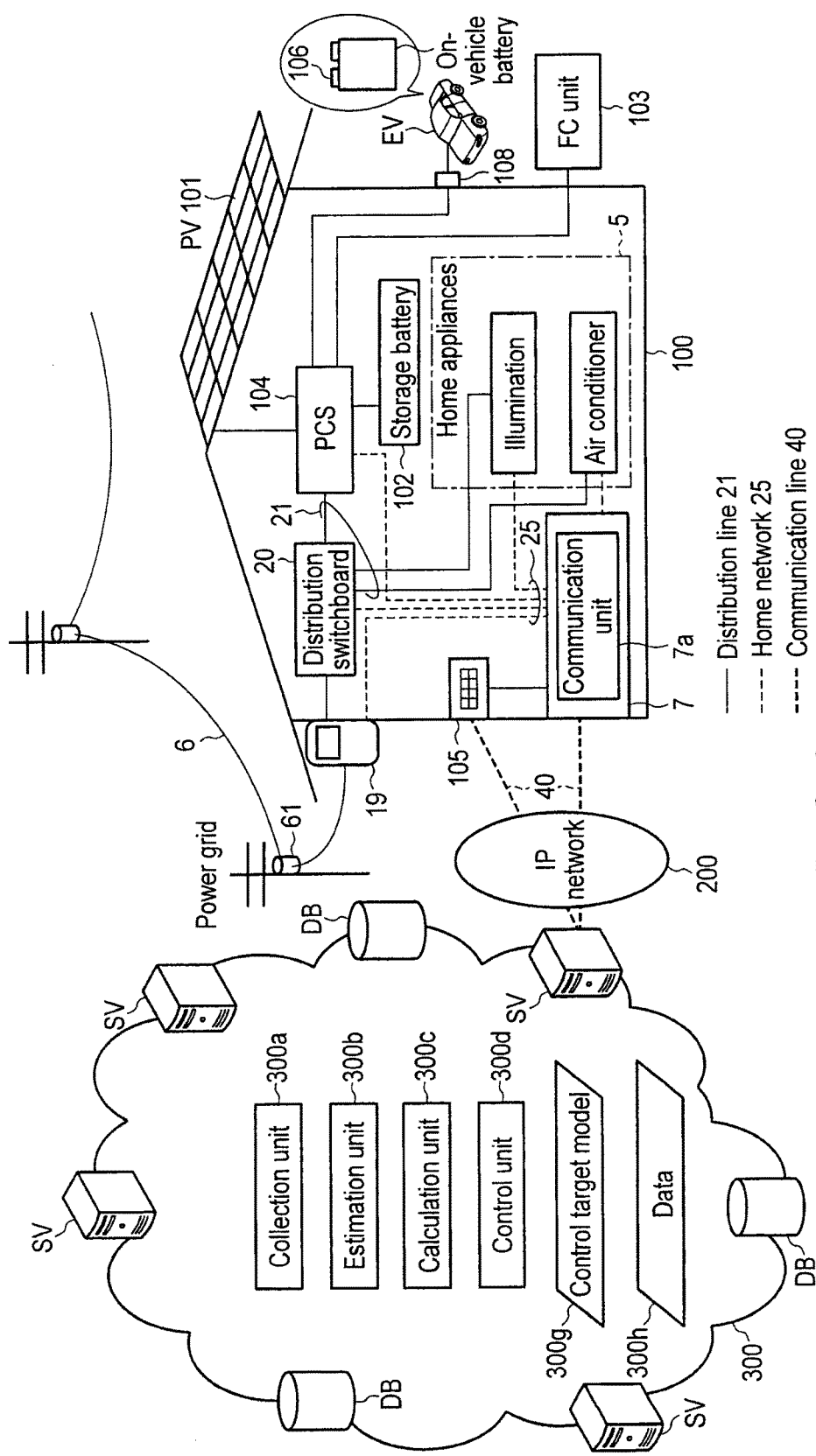
F I G. 9

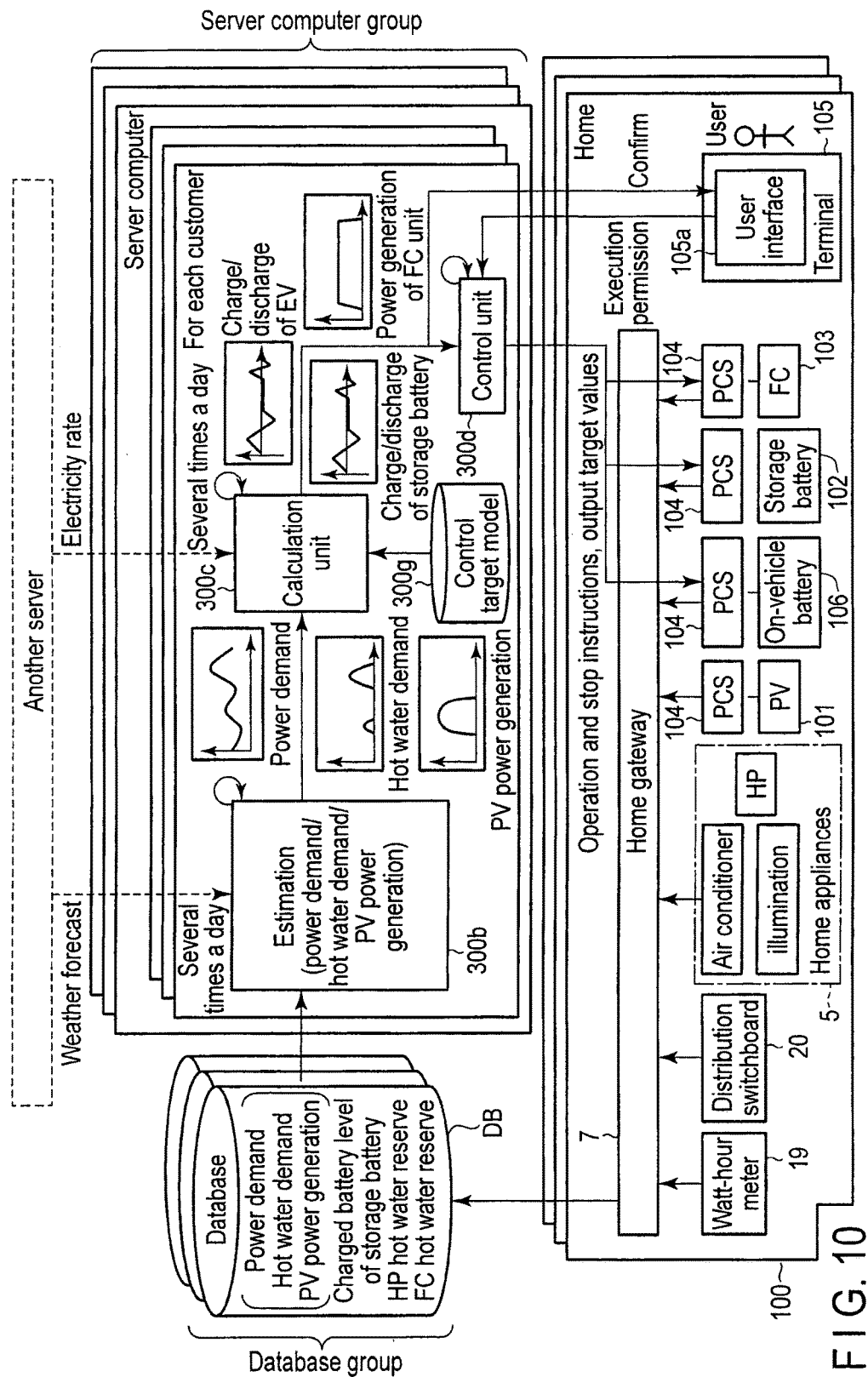
F I G. 10

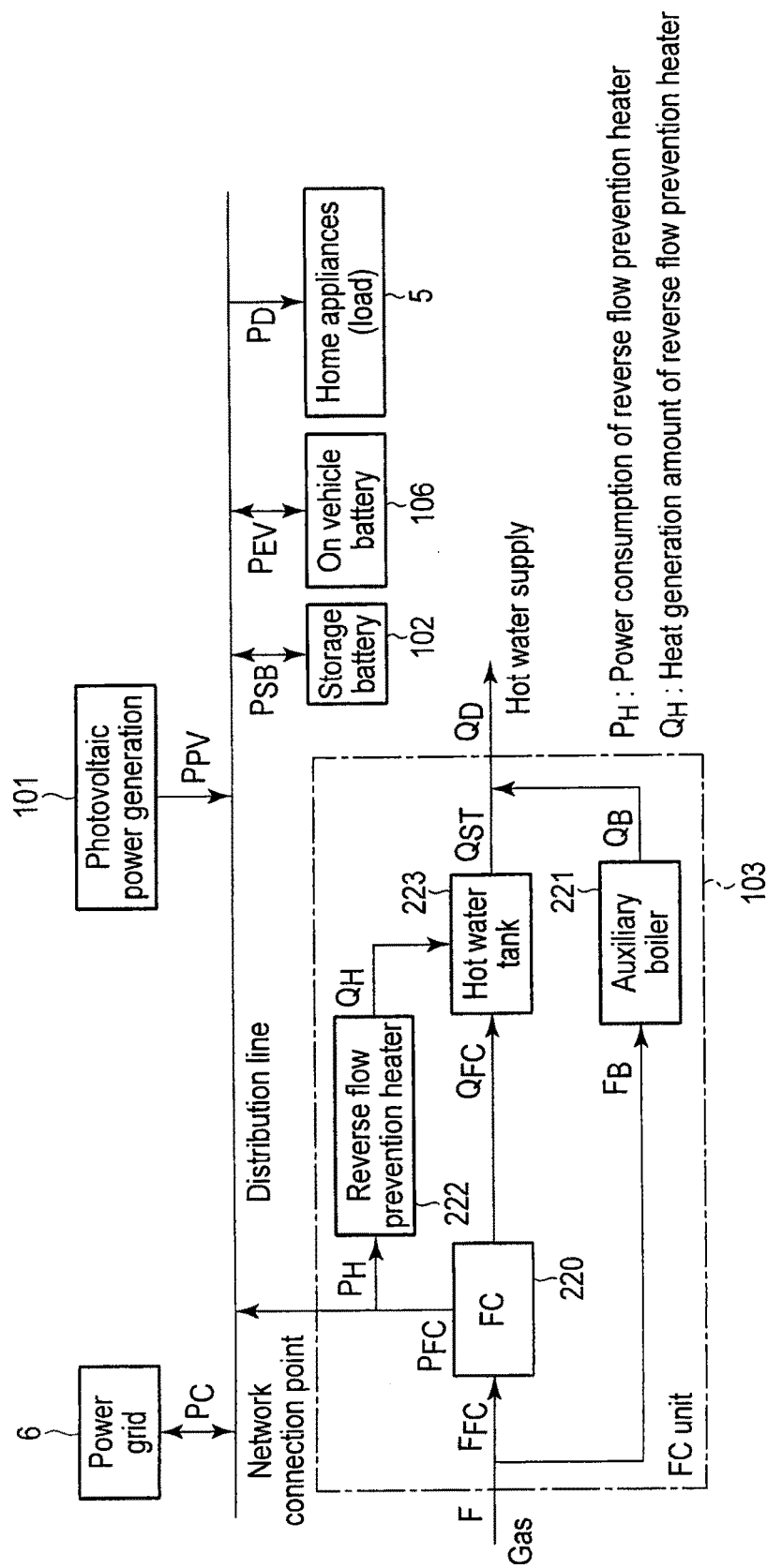
F I G. 11

| Time | 0:00 | 1:00 | ... | 23:00 |
|---|---|---|---|---|
| FC unit | $P_{FC}(0)$ | $P_{FC}(1)$ | ... | $P_{FC}(23)$ |
| On vehicle battery | $P_{EV}(0)$ | $P_{EV}(1)$ | ... | $P_{EV}(23)$ |
| Storage battery | $P_{BAT}(0)$ | $P_{BAT}(1)$ | ... | $P_{BAT}(23)$ |

Individual (rows 2–4); Generation

F I G. 12

| Time | 0:00 | 1:00 | ... | 23:00 |
|---|---|---|---|---|
| FC | $P_{FC}(0)$ | $P_{FC}(1)$ | ... | $P_{FC}(23)$ |
| On vehicle battery 1 | $P_{EV1}(0)$ | $P_{EV1}(1)$ | ... | $P_{EV1}(23)$ |
| On vehicle battery 2 | $P_{EV2}(0)$ | $P_{EV2}(1)$ | ... | $P_{EV2}(23)$ |
| Storage battery | $P_{BAT}(0)$ | $P_{BAT}(1)$ | ... | $P_{BAT}(23)$ |

Individual (rows FC through Storage battery)

Generation

F I G. 15

ENERGY MANAGEMENT SYSTEM, SERVER, ENERGY MANAGEMENT METHOD, AND STORAGE MEDIUM

CROSS-REFERENCE TO RELATED APPLICATION

This application is a Continuation Application of PCT Application No. PCT/JP2013/071266, filed Aug. 6, 2013 and based upon and claiming the benefit of priority from prior Japanese Patent Applications No. 2012-193101, filed Sep. 3, 2012; and No. 2012-245581, filed Nov. 7, 2012, the entire contents of all of which are incorporated herein by reference.

FIELD

Embodiments described herein relate generally to a technique of managing energy.

BACKGROUND

With the recent growing awareness of environmental preservation and concern about power shortage, a great deal of attention has been paid to a home energy management system (HEMS) or a distributed power supply such as a photovoltaic power generation (PV) system, storage battery, or fuel cell (FC) unit. Furthermore, attention has been paid to a zero energy home (ZEH) or net-zero energy home. The net-zero energy home indicates a home whose net primary energy consumption per year is almost zero.

Among distributed power supplies, a fuel cell is regarded as promising since it can stably generate power day and night in any weather conditions, and supply heat energy using exhaust heat. However, a reverse flow from a fuel cell to a commercial power grid is not permitted under contract with power companies. There have been proposed some techniques of preventing a reverse flow of power generated by a fuel cell.

Techniques associated with electric vehicles have been extensively developed. A battery mounted on the vehicle of this type has significantly progressed as compared with conventional batteries. It has been proposed to supply power to a home in case of a power failure or the like by taking advantage of such battery.

There is provided a technique of preventing a reverse flow by causing a dummy load or reverse flow prevention heater to consume dump power generated by a fuel cell. With this technique, energy is wasted. There is also a technique of storing dump power in a storage battery. However, when it becomes necessary to store power, the storage battery may have been fully charged to disable further charge.

Even if the reverse flow prevention heater and storage battery are used together, it takes long timer to change the output of the fuel cell. If, therefore, a period of time within which the power demand is low becomes long, a dump power generation amount unwantedly exceeds the capacity of a storage battery. In such case, there is no choice but to stop the operation of the fuel battery, or cause the reverse flow prevention heater to consume dump power. Even if a reverse flow can be prevented by isolating the fuel battery from the grid by a relay or the like, dump power is wasted under the present circumstances.

On the other hand, a combined technique of a HEMS and the on-vehicle battery of an electrical vehicle is under development. An energy management method which collectively considers electrical equipment in a home and an on-vehicle battery is particularly required.

BRIEF DESCRIPTION OF THE DRAWINGS

FIG. 1 is a view showing an example of a system according to the first embodiment;

FIG. 2 is a view showing an example of an energy management system according to the first embodiment;

FIG. 3 is a functional block diagram showing the main part of a HEMS according to the first embodiment;

FIG. 9 is a view showing an example of an energy management system according to the second embodiment;

FIG. 10 is a functional block diagram showing the main part of a cloud computing system 300 and HEMS according to the second embodiment;

FIG. 11 is a block diagram for explaining a control target model 300g according to the second embodiment;

FIG. 12 is a schematic view showing an example of the gene design of a genetic algorithm according to the second embodiment;

FIG. 15 is a schematic view showing an example of gene design according to the third embodiment;

DETAILED DESCRIPTION

Figure 4:
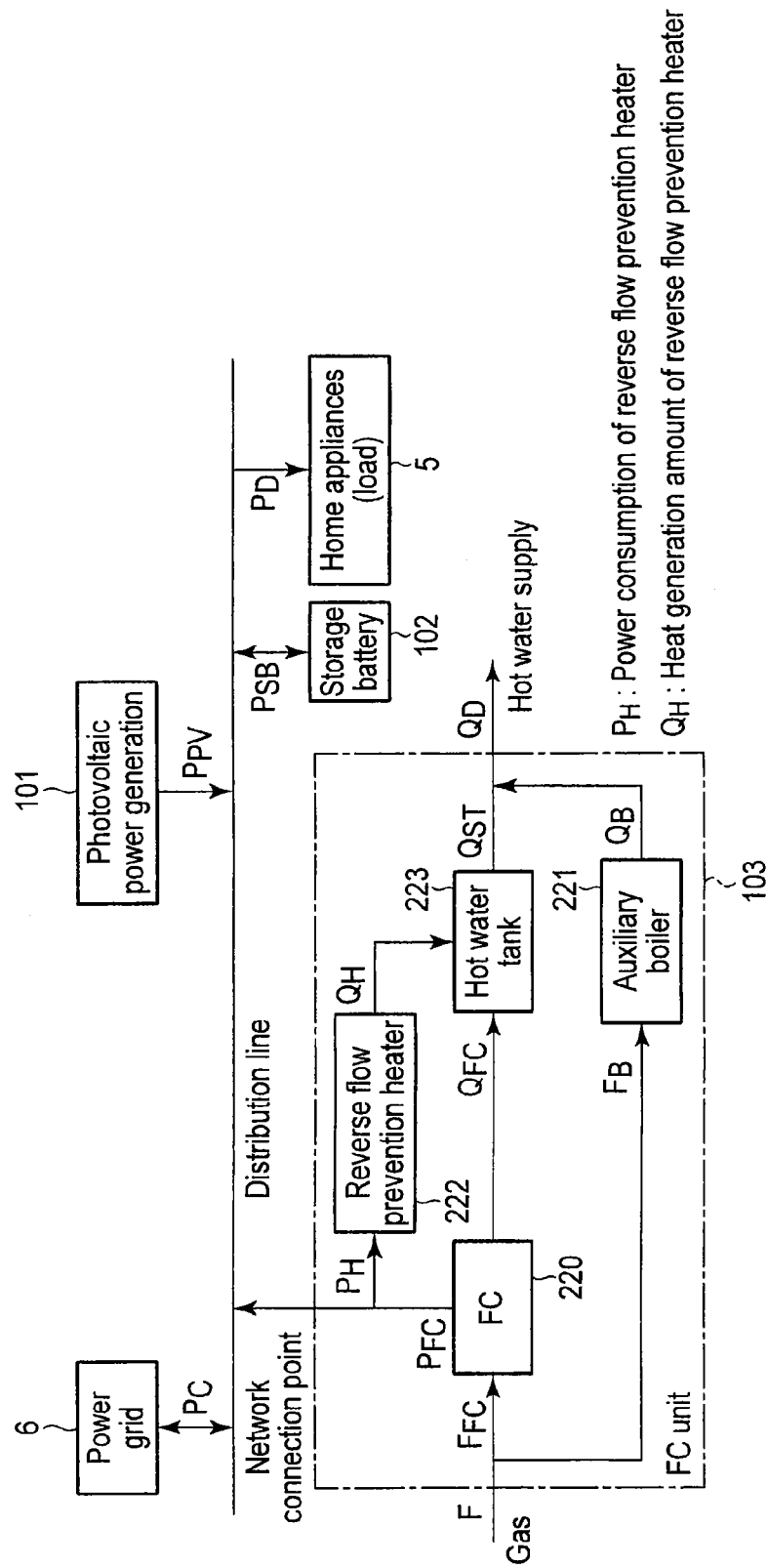
FIG. 4 is a block diagram for explaining an example of a control target model 300g according to the first embodiment.

In general, according to an embodiment, an energy management system includes a client and a server capable of communicating with the client. The server includes an acquisition unit, an estimation unit, a calculation unit and a control unit. The acquisition unit acquires data concerning electrical equipment in a building including a storage battery from the client. The estimation unit estimates an energy demand and an energy generation amount in the building based on the data. The calculation unit calculates, based on the energy demand and the energy generation amount, an operation schedule of the electrical equipment to optimize an energy balance in the building under a constraint that minimizes dump power to be discarded after the storage battery is fully charged. The control unit creates control information to control the electrical equipment based on the calculated operation schedule.

FIG. 1 is a view showing an example of a system according to an embodiment. FIG. 1 illustrates an example of a system known as a so-called smart grid. In an existing power grid, existing power plants such as an atomic power plant, a thermal power plant, and a hydraulic power plant are connected to various customers such as an ordinary household, a building, and a factory via the power grid. In the next generation power grid, distributed power supplies such as a PV (Photovoltaic Power generation) system and a wind power plant, storage batteries, new transportation systems, charging stations, and the like are additionally connected to the power grid. The variety of elements can communicate via a communication grid.

Systems for managing energy are generically called EMS's (Energy Management Systems). The EMS's are classified into several groups in accordance with the scale and the like. There are, for example, a BEMS (Building Energy Management System) for a building and a MEMS (Mansion Energy Management System) for an apartment house in addition to a HEMS for an ordinary household. There also exist a CEMS (Community Energy Management System) for a community and a FEMS (Factory Energy Management System) for a factory. Fine energy optimization control is implemented by causing these systems to cooperate.

According to these systems, an advanced cooperative operation can be performed between the existing power plants, the distributed power supplies, the renewable energy sources such as sunlight and wind force, and the customers. This produces a power supply service in a new and smart form, such as an energy supply system mainly using natural energy or a customer participating type energy supply/demand system by bidirectional cooperation of customers and companies.

[First Embodiment]

FIG. 2 is a view showing an example of an energy management system according to the first embodiment. A HEMS includes a client, and a cloud computing system (to be simply referred to as a cloud hereinafter) 300 serving as a server system capable of communicating with the client.

The client is formed centering on a home gateway (HGW) 7 installed in a customer home (home 100). The home gateway 7 has a function of communicating with the cloud 300. The home gateway 7 can receive various kinds of services offered by the cloud 300. For example, the home gateway 7 can request the cloud computing system 300 to offer a service for optimizing the energy consumption of electrical equipment in the home 100.

The cloud 300 includes a server computer SV and a database DB. The server computer SV can include a single or a plurality of server computers. The databases DB can be either provided in the single server computer SV or distributively stored in the plurality of server computers SV.

Referring to FIG. 2, power (AC voltage) supplied from a power grid 6 is distributed to households via, for example, a transformer 61 mounted on a pole, and supplied to a distribution switchboard 20 in the home 100 via a watt-hour meter (smart meter) 19. The watt-hour meter 19 has a function of measuring the power generation amount of an energy generation apparatus provided in the home 100, the power consumption of the home 100, the electric energy supplied from the power grid 6, the amount of power reversely flowing to the power grid 6, and the like. As is well known, a reverse flow of power generated from renewable energy to the power grid 6 is permitted.

The distribution switchboard 20 supplies, via distribution lines 21, power to home appliances (for example, illumination, air conditioner, and heat pump water heater (HP)) 5 and a power conditioning system (PCS) 104 connected to the distribution switchboard 20. The distribution switchboard 20 also includes a measuring device for measuring the electric energy for each feeder.

The home 100 includes electrical equipment. The electrical equipment is equipment connectable to the distribution line 21 in the home 100. The electrical equipment corresponds to equipment (load) that consumes power, equipment that generates power, equipment that consumes and generates power, a storage battery, and the like. That is, the home appliances 5, a PV system 101, a storage battery 102, a fuel cell (to be referred to as an FC unit hereinafter) 103, and the like correspond to the electrical equipment. The electrical equipment is detachably connected to the distribution line 21 via a socket (not shown) and then connected to the distribution switchboard 20 via the distribution line 21.

The PV system 101 is formed by installing a solar panel on the roof or exterior wall of the home 100. The DC voltage generated by the PV system 101 is supplied to the PCS 104. The PCS 104 supplies the DC voltage to the stationary storage battery 102 installed in each home 100 to charge it.

The PV system 101 is an energy creation apparatus that generates power energy from renewable energy. A wind power generation system or the like is also categorized as the energy creation apparatus. To the contrary, the FC unit 103 is a power generation unit that generates power from city gas or LP gas (liquefied petroleum gas).

Since a reverse flow of power generated by the FC unit 103 to the power grid 6 is prohibited, dump power may be generated. Although it is possible to store dump power in the storage battery 102, the capacity of the storage battery 102 is fixed, and thus the storage battery cannot be unlimitedly charged exceeding the limit. If the storage battery 102 is fully charged, dump power is converted into heat or the like, and then discarded, resulting in wasted energy and extra cost (gas rate). In this embodiment, a technique capable of avoiding such situation will be explained.

The PCS 104 includes a converter (not shown). The PCS 104 converts AC power from the distribution line 21 into DC power and supplies it to the storage battery 102. The power supplied from the power grid 6 can be stored in the storage battery 102 even at midnight. The PCS 104 also includes an inverter (not shown). The PCS 104 converts DC power supplied from the storage battery 102 or the FC unit 103 into AC power and supplies it to the distribution line 21. This allows the home appliances 5 to receive power from the storage battery 102 or the FC unit 103 via the PCS 104.

That is, the PCS 104 has the function of a power converter configured to transfer energy between the distribution line 21 and the storage battery 102 or the FC unit 103. The PCS 104 also has a function of stably controlling the storage battery 102 and the FC unit 103. Note that FIG. 2 shows a form in which the PCS 104 is commonly connected to the PV 101, storage battery 102, and the FC unit 103. The present invention is not limited to this, and each of the PV 101, storage battery 102, and FC unit 103 may have the function of a PCS.

Communication lines such as a LAN (Local Area Network) are built in the home 100, thereby forming a home network 25. The home gateway 7 is detachably connected to the home network 25 and an IP network 200 via a connector (not shown) or the like. The home gateway 7 can thus communicate with the electrical equipment including the watt-hour meter 19, the distribution switchboard 20, the PCS 104, and the home appliances 5 connected to the home network 25. Note that the home network 25 can be either a wired network or a wireless network.

The home gateway 7 includes a communication unit 7a as a processing function according to the first embodiment. The communication unit 7a transmits various kinds of data to the cloud 300 and receives various kinds of data from the cloud 300.

The home gateway 7 is a computer including a CPU (Central Processing Unit) and a memory (neither are shown). The memory stores programs including, for example, a command to communicate with the cloud 300, a command to request the cloud 300 to calculate an operation schedule (operation schedule) concerning the operation of electrical equipment, and a command to reflect a customer's intention on system control. The CPU functions based on various kinds of programs, thereby implementing various functions of the home gateway 7.

That is, the home gateway 7 transmits various kinds of data to the cloud 300 and receives various kinds of data from the cloud 300. The home gateway 7 is a client capable of communicating with the cloud 300 and the server computer SV. Various kinds of data transmitted from the home gateway 7 include request signals to request the cloud 300 to do various kinds of operations.

The home gateway 7 is connected to a terminal 105 via a wired or wireless network. The functions of the client can also be implemented by the combination of the home gateway 7 and the terminal 105. The terminal 105 can be, for example, a general-purpose portable information device, personal computer, or tablet terminal as well as a so-called touch panel.

The terminal 105 notifies the customer (user) of the operation state and power consumption of each of the home appliances 5, the PV 101, the storage battery 102, and the FC unit 103 using, for example, display on an LCD (liquid crystal display) or voice guidance. The terminal 105 includes an operation panel and receives various kinds of operations and setting input by the customer.

The IP network 200 is, for example, the so-called Internet or a VPN (Virtual Private Network) of a system vendor. The home gateway 7 can communicate with the server computer SV or send/receive data to/from the database DB via the IP network 200. The IP network 200 may include a wireless or wired communication infrastructure to form a bidirectional communication environment between the home gateway 7 and the cloud 300.

The cloud 300 includes a collection unit 300a, an estimation unit 300b, a calculation unit 300c, and a control unit 300d. The database DB of the cloud 300 stores a control target model 300g and various kinds of data 300h. The collection unit 300a, the estimation unit 300b, the calculation unit 300c, and the control unit 300d are functional objects arranged in the single server computer SV or the cloud 300. How to implement these functional objects in the system can easily be understood by those skilled in the art.

For example, the collection unit 300a, the estimation unit 300b, the calculation unit 300c, and the control unit 300d are implemented as programs to be executed by the server computer SV of the cloud 300. The programs can be executed by either a single computer or a system including a plurality of computers. When the commands described in the programs are executed, various functions according to the first embodiment are implemented.

The collection unit 300a periodically or aperiodically acquires various kinds of data concerning the electrical equipment of the home 100 from the home gateway 7 of the home 100. The collection unit 300a acquires the operation history of the terminal 105 by the user and the like from the terminal 105. Note that the collection unit 300a and the terminal 105 can also directly communicate with each other via a communication line 40.

The acquired data are held in the database DB as the data 300h. The data 300h include the power demand (demand) of each home 100, the power consumption of each of the home appliances 5, the hot water supply amount and the operation state of the FC unit 103, the charged battery level and the amount of charged/discharged power of the storage battery 102, and the power generation amount of the PV system 101. In addition, the data 300h can include meteorological data provided by the Meteorological Agency or the like. These data are used as data concerning the electrical equipment for energy demand estimation or the like.

The estimation unit 300b estimates the energy demand of each of the home appliances 5 on a time basis, the total energy demand in the home 100 on a time basis, an energy generation amount, or the like based on the data 300h acquired by the collection unit 300a. That is, the estimation unit 300 estimates the power demand, hot water demand, PV power generation amount, and the like of the home 100.

The calculation unit 300c calculates the operation schedule of the electrical equipment based on the control target model 300g including the storage battery 102 and the FC unit 103 in the home 100, and the estimated power demand, hot water demand, and PV power generation amount. That is, the calculation unit 300c calculates the charge/discharge schedule of the storage battery 102 and the power generation schedule of the FC unit 103 based on the power demand, hot water demand, and PV power generation amount.

That is, the calculation unit 300c calculates the operation schedule concerning the operation of the electrical equipment, which can optimize the energy balance in the home 100, based on the estimated energy demand. This processing is called optimal scheduling.

The energy balance is, for example, the heat/electricity balance, and is evaluated by the balance between the cost of power consumed by the home appliances 5 and the sales price of power mainly generated by the PV system 101. The calculated time-series operation schedule of the electrical equipment is stored in the database DB.

Furthermore, the calculation unit 300c calculates an operation schedule under a predetermined constraint. In the first embodiment, the calculation unit 300c calculates an operation schedule under a constraint that minimizes dump power to be discarded after the storage battery 102 is fully charged.

The control unit 300d creates control information to control the electrical equipment based on the calculated operation schedule. That is, the control unit 300d creates operation and stop instructions, output target values, and the like for charge/discharge and operation of the storage battery 102 or power generation of the FC unit 103, based on the result of optimal scheduling. These pieces of control information are transmitted to the terminal 105 or the home gateway 7 via the communication line 40.

The terminal 105 of the home 100 includes an interface unit (a user interface 105a shown in FIG. 3) for reflecting the customer's intention on control of the electrical equipment based on the control information transmitted from the control unit 300d. The user interface 105a includes a display device that can display the charge/discharge schedule of the storage battery 102 or the power generation schedule of the FC unit 103. The customer can see the contents displayed on the display device and confirm the schedule or select permission or rejection of execution of the displayed schedule. The customer's intention can thus be reflected on schedule execution.

The customer can also input, via the user interface 105a, an instruction (command) to request the cloud 300 to recalculate the schedule or supply information necessary for schedule recalculation to the system. It can be understood that in the above-described arrangement, the server computer SV is positioned as a main apparatus, and the home gateway 7 is positioned as a sub-apparatus that receives a control signal from the main apparatus.

FIG. 3 is a functional block diagram showing the main part of a HEMS according to the first embodiment. Referring to FIG. 3, data including, for example, the power consumption and operation state of the home appliances 5 in the home 100 for every predetermined time, the charged battery level and the amount of charged/discharged power of the storage battery 102, and the power demand, hot water demand, and PV power generation amount of the home 100 are periodically or aperiodically transmitted to the cloud 300 via the home gateway 7.

ECHONET, ECHONET Lite, and the like are known as home communication protocols in the home 100. The home gateway 7 collects various kinds of data from electrical equipment having a communication function of this type via the home network 25. The collected various kinds of data are transmitted to the cloud 300.

Providing a measuring device having a communication function in the distribution switchboard 20 enables the home gateway 7 to collect the power consumption and operation state of the electrical equipment. The home gateway 7 can also collect data from a DC apparatus such as the PV system 101, the storage battery 102, or the FC unit 103 via the corresponding PCS 104.

When actual data becomes larger or smaller than a variable predetermined amount associated with each demand or power generation amount set by the customer via the user interface 105a, the home gateway 7 transmits the data to the cloud 300. "Aperiodic" means transmission at such a timing. The operation history of the terminal 105 by the customer and the like are also transmitted to the cloud 300. These data and information are stored in the databases DB.

The estimation unit 300b provided for each customer estimates the power demand, hot water demand, and PV power generation amount for every predetermined time of a target day using meteorological data such as a weather forecast in addition to the power demand, hot water demand, and PV power generation amount of the collected data. The meteorological data is distributed from another server (for example, the Meteorological Agency) at several timings a day. The estimation calculation may be executed in synchronism with the timing of meteorological data reception.

A calculation unit 300c provided for each customer executes optimal scheduling concerning operation control of the electrical equipment based on the energy demand for every predetermined time calculated by estimation calculation, an energy supply amount, a unit price of energy, the control target model 300g, and the like.

The estimation unit 300b and the calculation unit 300c can be implemented as, for example, functional objects dedicated to each customer. That is, the functions of the estimation unit 300b and the calculation unit 300c can be provided for each customer. Such a form can be obtained by, for example, creating a plurality of threads in the program execution process. This form is advantageous because, for example, security can easily be retained.

Alternatively, the estimation unit 300b and the calculation unit 300c can be implemented as functional objects provided for a plurality of customers. That is, the operations by the estimation unit 300b and the calculation unit 300c can be executed for a group of a plurality of customers. This form is advantageous because, for example, the calculation resource can be saved.

FIG. 4 is a block diagram for explaining an example of the control target model 300g according to the first embodiment. The control target model 300g includes the power grid 6, the FC unit 103, the storage battery 102, the PV system 101, and the home appliances 5 (load). The FC unit 103 includes an FC main body 220, an auxiliary boiler 221, a reverse flow prevention heater 222, and a hot water tank 223. Table 1 shows variates in FIG. 4.

[Table 1]

t: time [h]

$P_C(t)$: power [kW] purchased from the power grid 6 (a negative value indicates sold power)

$P_{FC}(t)$: power generation amount [kW] of the FC main body 220

$P_H(t)$: power consumption [kW] of the reverse flow prevention heater 222

$P_{PV}(t)$: power generation amount [kW] of the PV system 101

$P_D(t)$: power demand [kW] of the home 100

$P_{SB}(t)$: discharged power [kW] of the storage battery 102 (a negative value indicates charged power)

$Q_D(t)$: hot water demand [kcal/h]

$Q_{FC}(t)$: exhaust heat amount [kcal/h] of the FC main body 220

$Q_{ST}(t)$: hot water supply amount [kcal/h] from the hot water tank 223

$Q_B(t)$: hot water supply amount [kcal/h] from the auxiliary boiler 221

$Q_H(t)$: heat generation amount [kcal/h] of the reverse flow prevention heater 222

F(t): gas supply amount [kcal/h]

$F_{FC}(t)$: gas supply amount [kcal/h] to the FC main body 220

$F_B(t)$: gas supply amount [kcal/h] to the auxiliary boiler 221

S(t): charged battery level [kWh] of the storage battery 102

H(t): hot water reserve [kcal] of the hot water tank 223

The control target model 300g indicates the input/output relationship of each component, and the relationship between input or output variables of the components. For example, the control target model 300g can be represented by relations (1) to (10) below.

$$F(t)=F_{FC}(t)+F_B(t) \tag{1}$$

$$P_{FC}(t)=aF_{FC}(t)+b \tag{2}$$

$$Q_{FC}(t)=\alpha F_{FC}(t)+\beta \tag{3}$$

a, b, α, β: coefficients determined based on the efficiency of the FC unit $$rH(t-1)+Q_{FC}(t)+Q_H(t)=H(t)+Q_{ST}(t) \tag{4}$$

r: hot water storage efficiency $$H_{min} \leq H(t) \leq H_{max} \tag{5}$$

$H_{min}$, $H_{max}$: capacity limits of the hot water tank 223

$$P_C(t)+P_{PV}(t)+P_{FC}(t)+P_{SB}(t)=P_D(t)+P_H(t) \tag{6}$$

$$P_{FC}(t)+P_{SB}(t) \leq P_D(t)+P_H(t) \tag{7}$$

$$P_H(t) \leq P_{FC}(t) \tag{8}$$

$$S_{min} \leq S(t) \leq S_{max} \tag{9}$$

$S_{min}$, $S_{max}$: capacity limits of the storage battery 102

$$-P_{FC\_DOWN} \leq P_{FC}(t) - P_{FC}(t-1) \leq P_{FC\_UP} \quad (10)$$

$P_{FC\_UP}$ [kW/h]: upper limit of power generation amount increase rate of the FC unit 103

$P_{FC\_DOWN}$ [kW/h]: upper limit of power generation amount decrease rate of the FC unit 103

In equation (1), the gas supply amount F(t) is represented as the sum of the supply amount $F_{FC}(t)$ to the FC main body 220 and the supply amount $F_B(t)$ to the auxiliary boiler. Assume that for the gas supply amount $F_{FC}(t)$, the FC main body 220 generates the power $P_{FC}(t)$ and exhausts the heat $Q_{FC}(t)$. In this case, the input/output characteristic of the FC main body 220, that is, the relationship between the gas supply amount and the power generation amount or exhaust heat amount of the FC main body 220 is approximated as represented by equation (2) or (3).

The reverse flow prevention heater 222 controls to prevent a reverse flow of dump power to the power grid 6 by converting the dump power $P_H(t)$ into heat of the calorific value $Q_H(t)$ and consuming it. The auxiliary boiler 221 supplies the hot water $Q_B(t)$ which cannot be supplied by hot water $Q_{ST}(t)$ from the hot water tank 223 to satisfy the hot water demand.

As indicated by equation (4), the hot water reserve H(t) of the hot water tank 223 increases or decreases according to the exhaust heat amount $Q_{FC}(t)$ of the FC main body 220, the heat generation amount $Q_H(t)$ of the reverse flow prevention heater 222, and the hot water amount $Q_{ST}(t)$.

The left side of equation (4) represents a calorific value entering the hot water tank 223 by a hot water amount. The first term on the left side is "r·H(t−1)=survival rate×last hot water reserve=hot water amount after heat radiation" where the hot water storage efficiency (survival rate) r is a coefficient representing the percentage of heat remaining after heat radiation from a time t−1 to a time t. The second term on the left side indicates the exhaust heat recovery amount of the FC unit and the third term on the left side indicates the heat generation amount of the reverse flow prevention heater, both of which is a value converted into a hot water amount.

Relation (5) indicates the capacity limit of the hot water tank 223. The storage battery 102 can be formed into a model in which the charged battery level S(t) increases or decreases according to the charged/discharged power $P_{SB}(t)$.

Equation (6) indicates the power demand-supply balance. $P_D(t)$ represents the power demand of the home 100, $P_C(t)$ represents purchased power or sold power, and $P_{PV}(t)$ represents the power generation amount of the PV 101. Relations (7) and (8) indicate constraints that prohibit a reverse flow from the FC main body 220 and storage battery 102. Relation (9) indicates the constraint of the capacity of the storage battery 102.

Relation (10) indicates a constraint that limits a change in power generation amount of the FC unit 103 (FC main body 220) with time to a predetermined range. That is, relation (10) indicates a constraint that limits a change in power generation amount of the FC main body 220 from the time t−1 to the time t to the range from the lower limit value $-P_{FC\_DOWN}$ of the power generation amount decrease rate of the FC unit to the upper limit value $P_{FC\_UP}$ of the power generation amount increase rate of the FC unit.

Under the above constraints, the calculation unit 300c (FIG. 2 or 3) calculates the schedule of the power generation amount $P_{FC}(t)$ of the FC unit 103 and the schedule of the charged/discharged power $P_{SB}(t)$ of the storage battery 102 for minimizing the heat/electricity balance (energy cost) based on the power demand, hot water demand, PV power generation amount, unit prices of electricity and gas, and sales price of power. As the optimization algorithm, for example, a genetic algorithm is usable. The action of the above arrangement will be described next.

Figure 5:
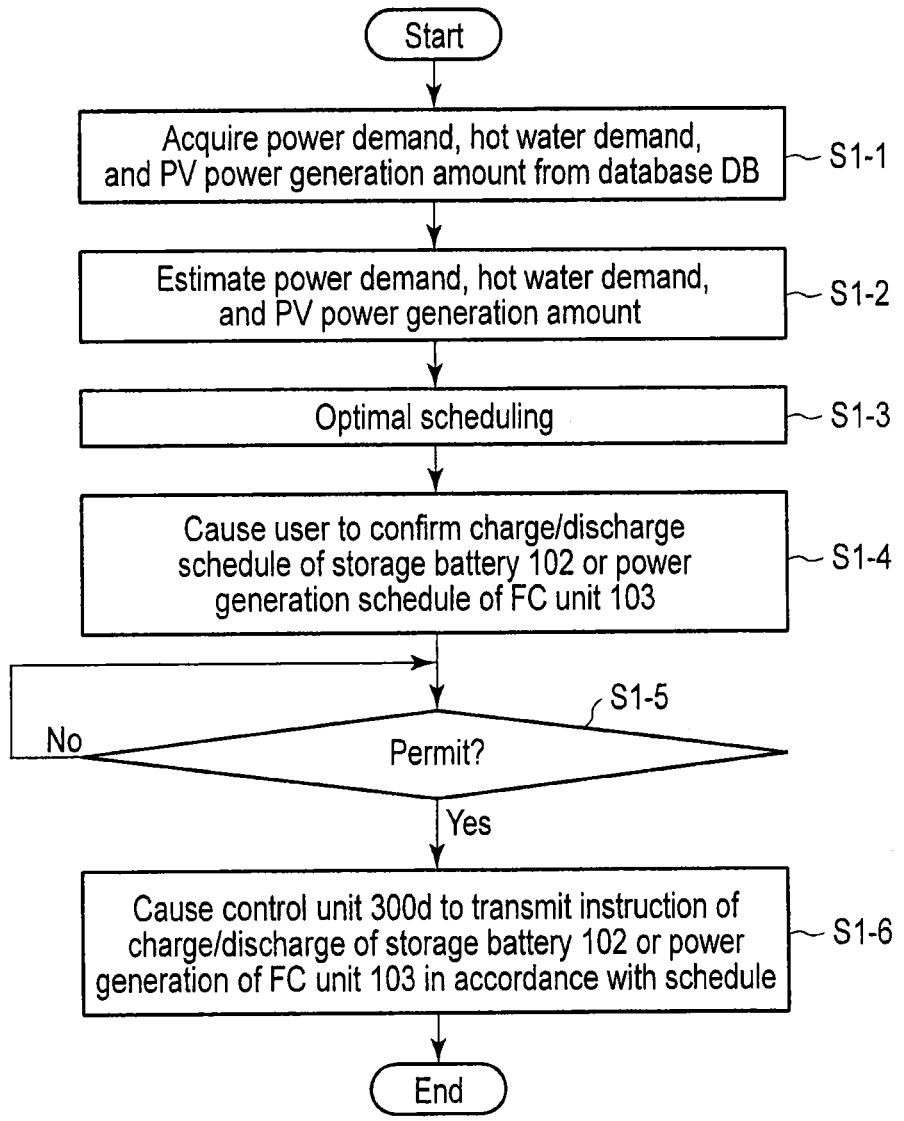
FIG. 5 is a flowchart showing a processing procedure according to the first embodiment.

FIG. 5 is a flowchart showing a processing procedure according to the first embodiment. Power demand estimation, hot water demand estimation, PV power generation amount estimation, and the like are necessary for the optimization operation. Hence, the optimization operation is executed, for example, in synchronism with the timings of estimation calculation which is executed several times a day.

Referring to FIG. 5, the estimation unit 300b acquires the power demand, hot water demand, and PV power generation amount for every predetermined time from the database DB (step S1-1). In this step, past data such as data of the same day last year may be acquired in addition to the current data. Next, the estimation unit 300b estimates the power demand, hot water demand, and PV power generation amount for every predetermined time to calculate the operation schedules (step S1-2).

The calculation unit 300c calculates the schedule of the power generation amount of the FC unit 103 for every predetermined time and the schedule of the charge/discharge amount of the storage battery 102 for every predetermined time so as to minimize the heat/electricity balance (step S1-3). The calculated schedules are stored in the database DB.

Next, the system transmits a message signal indicating the schedule of the charge/discharge amount of the storage battery or the schedule of the power generation amount of the FC unit 103 to the terminal 105 via the IP network 200. The terminal 105 decodes the message signal and displays the various schedules on the interface (step S1-4). The routine from the message signal transmission to the display is executed periodically or in response to a request from the user.

The cloud 300 waits for arrival of a permission message signal indicating that execution of the operation schedule has been permitted by the user (step S1-5). If execution of the operation schedule has been permitted, the control unit 300d (apparatus operation scheduler) transmits, to the home gateway 7 in the home 100 via the IP network 200, control information to control the electrical equipment in the home 100 according to the created schedules (step S1-6). The control information includes, for example, operation and stop instructions, output target values, and the like for charge/discharge of the storage battery 102 or power generation of the FC unit 103. The above procedure is repeated at the time interval of scheduling.

The control unit 300d creates operation and stop instructions, output target values, and the like for charge/discharge of the storage battery 102 or power generation of the FC unit 103, based on the result of optimal scheduling at the time interval of scheduling, and transmits them to the home gateway 7 in the home 100. The customer instructs, via the user interface 105a, the system to permit or prohibit control based on the transmitted control information.

Figure 6:
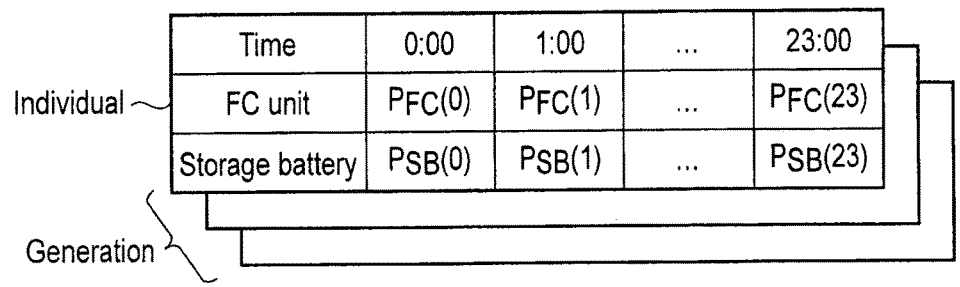
FIG. 6 is a schematic view showing an example of the gene design of a genetic algorithm according to the first embodiment.

FIG. 6 is a schematic view showing an example of the gene design of a genetic algorithm according to the first embodiment. In the first embodiment, the power generation amount $P_{FC}(t)$ of the FC unit 103 and the charged/discharged power $P_{SB}(t)$ of the storage battery 102 are incorporated in a gene. The operation schedule of the storage battery 102 and the FC unit 103 for one day is an individual, and one generation includes a plurality of individuals.

Equation (11) represents a fitness Fit to be maximized. An operation schedule is calculated by optimizing the fitness Fit as an objective function. Equation (12) below represents a heat/electricity balance C. Equation (13) below represents a cost $g(P_{FC}, P_{SB})$ incurred by the discontinuity of a device operation. The total of heat/electricity balances C from t=0 to t=23 corresponds to the sum for 24 hours.

$$\text{Fit} = \frac{1}{f(C) + g(P_{FC}, P_{SB})} \quad (11)$$

$f(c)$: monotonically increasing function including C as a variable ($f(c) > 0$)

$$C = \sum_{t=0}^{23} (c_F F(t) + c_E(t) P_C(t)) \quad (12)$$

$$C_E(t): \begin{cases} \text{unit price of electricity (¥/kWh)} & P_C(t) > 0 \\ \text{PV sales price(¥/kWh)} & P_C(t) \leq 0 \end{cases}$$

$C_F$: unit price of gas(¥/kcal)

$$g(P_{FC}, P_{SB}) = w_1 |P_{FC}(t) - P_{FC}(t-1)| + w_2 |P_{SB}(t) - P_{SB}(t-1)| \quad (13)$$

$w_1, w_2$: weights

The fitness Fit represented by equation (11) is the reciprocal of the sum of the monotone increasing function f(C) including the heat/electricity balance C per day as a variable and the cost $g(P_{FC}, P_{SB}) > 0$ incurred by the discontinuity of the device operation. The heat/electricity balance C may become negative when the PV power generation amount largely exceeds the power demand of the home 100. To match a decrease in the heat/electricity balance C with an increase in the fitness Fit, therefore, the form indicated by equation (11) is adopted. In the first embodiment, the function f(C)>0 is used.

The fitness Fit is maximized by setting values for the power demand, hot water demand, PV power generation amount, unit price of electricity, unit price of gas, and PV sales price to the above equations, and repeating genetic manipulations such as mutation, crossover, and selection. These manipulations make it possible to calculate a series of the power generation amount $P_{FC}(t)$ of the FC unit 103 and the charged/discharged power $P_{SB}(t)$ of the storage battery 102, which makes the heat/electricity balance C small.

Figure 7:
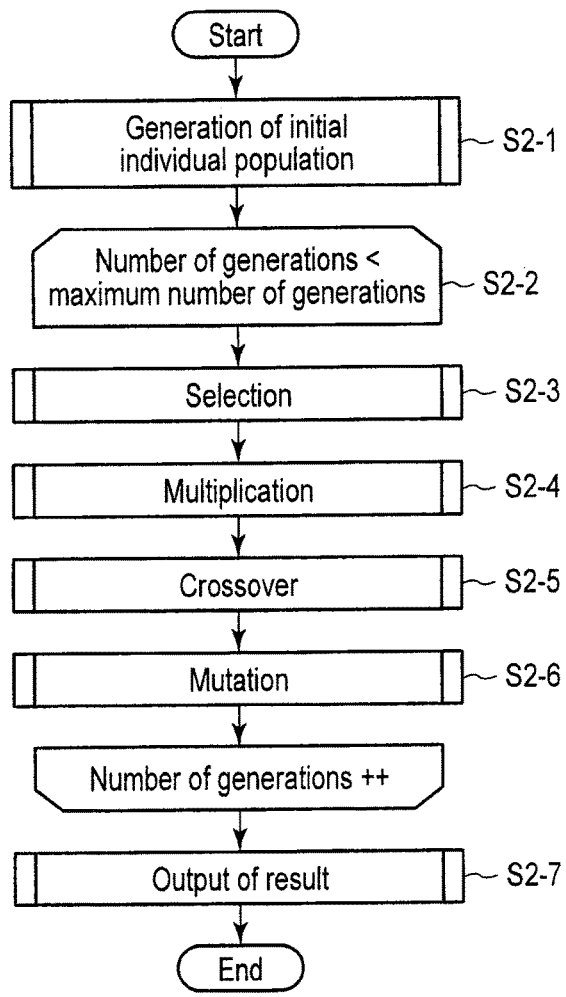
FIG. 7 is a flowchart showing an example of the procedure of an optimization operation according to the first embodiment.

FIG. 7 is a flowchart showing an example of the procedure of the optimization operation according to the first embodiment. A genetic algorithm will be exemplified as the optimization algorithm. The processing procedure of the genetic algorithm will be described below.

(Step S2-1) Generation of Initial Individual Population

In this step, the calculation unit 300c generates n initial individuals. The genes of the individuals are, for example, the operation and stop of the FC unit 103, the power generation amount of the FC unit 103, and the charged/discharged power of the storage battery 102 at the time t. Gene sequences corresponding to, for example, one day (24 hrs) can be provided. Each individual is a set of gene sequences of the FC unit 103 and the storage battery 102. The bits of the genes of each individual that does not meet the constraints are inverted, thereby modifying the individual to meet the constraints.

(Step S2-2)

The loop of step S2-2 is processing of repeating processing in steps S2-3 to S2-6. When the loop is repeated a predetermined number of times, the algorithm operation ends. Furthermore, the fitness of each individual and the average fitness of the generation are calculated. The average fitness of the generation is compared with the average fitness of two previous generations. If the result of the comparison is equal to or smaller than an arbitrarily set value e, the algorithm operation ends.

(Step S2-3) Selection

In this step, the calculation unit 300c removes individuals that do not meet the constraints. Hence, the individuals that do not meet the constraints are weeded out. If there are individuals in a predetermined number or more, individuals whose fitness is poor (low) are removed to maintain the number of individuals below the predetermined number.

(Step S2-4) Multiplication

In this step, if the number of individuals is smaller than a predefined number of individuals, the calculation unit 300c multiplies an individual having the best fitness.

(Step S2-5) Crossover

The calculation unit 300c performs pairing at random. The pairing is performed as much as the percentage (crossover rate) to the total number of individuals. A gene locus is selected at random for each pair, and one-point crossover is performed.

(Step S2-6) Mutation

In this step, the calculation unit 300c randomly selects individuals of a predetermined percentage (mutation rate) of the total number of individuals and inverts the bits of the genes of arbitrary (randomly decided) gene loci of each individual.

The procedure of step S2-3 to step S2-6 is repeated until a condition given by number of generations<maximum number of generations is met while incrementing the number of generations (loop of step S2-2). If this condition is met, the calculation unit 300c outputs the result (step S2-7), and ends the calculation procedure.

Figure 8:
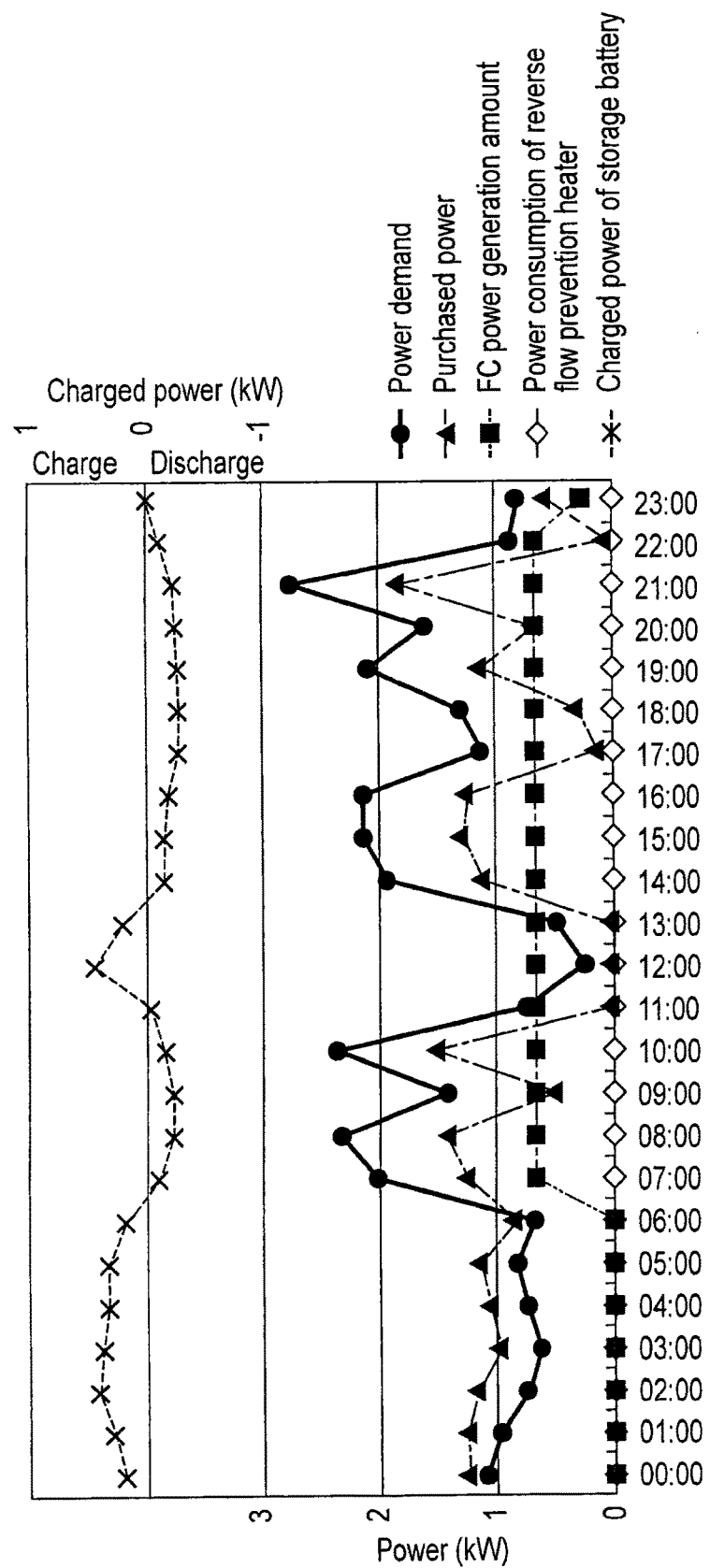
FIG. 8 is a timing chart for explaining an effect obtained in the first embodiment.

FIG. 8 is a timing chart for explaining an effect obtained in the first embodiment. FIG. 8 shows an example of the operation schedule of the storage battery 102 and the FC unit 103 for one day, which has been calculated based on the estimation results of the power demand and hot water demand of the home 100 for one day. By assuming different rates for day and night, the unit price of electricity is 28 ¥/kWh from 7:00 to 23:00, and 9 ¥/kWh from 23:00 to 7:00 on next day. FIG. 8 shows the result of calculation using only the power demand, hot water demand, and unit prices of electricity and gas without considering improvement in heat/electricity balance by selling power.

The operation schedule of the storage battery 102 indicates that the storage battery 102 is charged during a time zone (0:00 to 6:00) when the unit price of electricity is low and is discharged during a time zone (7:00 to 10:00 and 13:00 to 22:00) when the unit price of electricity is high. With this operation, the purchased power during the time zone when the unit price of electricity is high can be reduced, thereby decreasing the electricity rate.

The FC unit 103 operates at a maximum output, and stores generated dump power in the storage battery 102 during a period of time (12:00 to 14:00) when the power generation amount exceeds the power demand. It is, therefore, possible to prevent the generated power from being wasted by the reverse flow prevention heater 222 and to reduce the gas rate. It is apparent that the reverse flow prevention heater 222 does not always operate for 24 hours.

As described above, in the first embodiment, the PV power generation amount, power demand, and hot water demand of the home 100 are estimated. Energy is managed so as to minimize the energy cost (heat/electricity cost) by executing optimization calculation for minimizing an evaluation function under preset constraints based on the estimated values. That is, the operation schedule of the FC unit 103 and the charge/discharge schedule of the storage battery 102 are optimized based on a model in which the power generation amount of the FC unit 103 is variable. It is thus possible to reduce the heat/electricity cost by minimizing the operation of the reverse flow prevention heater 222.

As indicated by equations (11) and (12), the function representing the fitness Fit to be maximized includes the gas rate required for the operation of the FC unit 103. A schedule which wastefully operates the reverse flow prevention heater 222 is weeded out in the optimization calculation process under the condition that a possible solution exists.

As indicated by relation (10), there is provided the constraint that a change in the power generation amount of the FC unit 103 from the time t−1 to the time t falls within the range from $-P_{FC\_DOWN}$ (the lower limit value of the power generation amount decrease rate of the FC unit 103) to $P_{FC\_UP}$ (the upper limit value of the power generation amount increase rate of the FC unit 103). This makes it possible to create a power generation schedule so that a change in the power generation amount of the FC unit 103 does not exceed the follow capability for the power demand. That is, under the constraint, it is possible to create the power generation schedule of the FC unit 103 within the range that does not exceed the follow capability for the power demand. It is thus possible to cause the FC unit 103 to operate according to the created power generation schedule of the HEMS.

Especially, by combining the estimation procedure of step S1-2 and the optimal scheduling of step S1-3 (FIG. 5), it is possible to create a demand-supply schedule such as the power generation schedule of the FC unit or the charge/discharge schedule of the storage battery according to power demand estimation, hot water demand estimation, PV power generation estimation for a period of time such as about one day in consideration of the overall balance. This can, therefore, avoid a case in which it is impossible to store the dump power of the FC unit 103 because the storage battery 102 has been fully charged, or a case in which the charged battery level of the storage battery 102 is short when the storage battery 102 should be discharged.

As described above, according to the first embodiment, it is possible to effectively use dump power which cannot reversely flow to the commercial power grid without wasting it. It is, therefore, possible to provide an energy management system, server, energy management method, and storage medium, which can prevent dump power from being wasted.

[Second Embodiment]

FIG. 9 is a view showing an example of an energy management system according to the second embodiment. The same reference numerals as in FIG. 2 denote the same parts in FIG. 9, and only different parts will be described here. An electrical vehicle (to be referred to as a vehicle hereinafter) EV is connected to a distribution line 21 in a home 100.

Dump power generated in the home 100 can be stored in a storage battery 102 or an on-vehicle battery 106 of the vehicle EV but cannot be stored to exceed the limit. In the second embodiment, a technique capable of avoiding such situation will be described.

The capacity of the storage battery 102 installed in the home 100 is generally fixed. Similarly, the capacity of the on-vehicle battery 106 is generally fixed. Each of the batteries 102 and 106 can be considered as a fixed-capacity storage battery. However, when combined, these storage batteries can be generally considered as a storage battery (storage battery system) whose capacity varies. The capacity of the storage battery system increases or decreases depending on whether the vehicle EV is connected to the distribution line 21 in the home 100, and also changes depending on the number of vehicles EV or the performance of the on-vehicle battery 106. In the second embodiment, assume that the capacity of the storage battery system changes in this way.

A PCS 104 is connected, via the distribution line 21, to a connector 108 connectable to the vehicle EV. The PCS 104 converts AC power supplied from the distribution line 21 into DC power and supplies it to the vehicle EV. The PCS 104 converts DC power supplied from the on-vehicle battery 106 into AC power and supplies it to the distribution line 21. This allows charge/discharge of the on-vehicle battery 106 via the distribution line 21.

Data 300h includes, for example, the power demand of each home 100, the power consumption of each of home appliances 5, the hot water supply amount and the operation state of an FC unit 103, the charged battery level and the amount of charged/discharged power of the storage battery 102, the charged battery level and the amount of charged/discharged power of the on-vehicle battery 106, and the power generation amount of a PV system 101.

A calculation unit 300c calculates the charge/discharge schedule of the storage battery 102, the charge/discharge schedule of the on-vehicle battery 106, and the power generation schedule of the FC unit 103 based on a control target model 300g including the storage battery 102 of the home 100, the on-vehicle battery 106, and the FC unit 103, and an estimated power demand, hot water demand, and PV power generation amount.

A control unit 300d creates operation and stop instructions, output target values, and the like for charge/discharge and operation of the storage battery 102, charge/discharge and operation of the on-vehicle battery 106, and power generation of the FC unit 103, based on the result of optimal scheduling by the calculation unit 300c.

FIG. 10 is a functional block diagram showing the main part of a HEMS according to the second embodiment. The same reference numerals as in FIG. 3 denote the same parts in FIG. 10, and only different parts will be described here.

Referring to FIG. 10, data such as the charged battery level and the amount of charged/discharged power of the on-vehicle battery 106 are periodically or aperiodically transmitted to a cloud 300 via a home gateway 7. It is also possible to collect data from a DC apparatus such as the PV system 101, the on-vehicle battery 106, the storage battery 102, or the FC unit 103 via the corresponding PCS 104.

FIG. 11 is a block diagram for explaining an example of the control target model 300g according to the second embodiment. The same reference numerals as in FIG. 4 denote the same parts in FIG. 11, and only different parts will be described here.

The control target model 300g includes a power grid 6, the FC unit 103, the storage battery 102, the on-vehicle battery 106, the PV system 101, and the home appliances 5 (load). The FC unit 103 includes an FC main body 220, an auxiliary boiler 221, a reverse flow prevention heater 222, and a hot water tank 223. Table 2 shows variates in FIG. 11

[Table 2]

t: time [h]

P: power [kW] purchased from the power grid 6 (a negative value indicates sold power)

$P_{FC}(t)$: power generation amount [kW] of the FC main body 220

$P_H(t)$: power consumption [kW] of the reverse flow prevention heater 222

$P_{PV}(t)$: power generation amount [kW] of the PV system 101

$P_D(t)$: power demand [kW] of the home 100

$P_{SB}(t)$: discharged power [kW] of the storage battery system (a negative value indicates charged power)

$P_{BAT}(t)$: charged power [kW] of the stationary storage battery 102 (a negative value indicates discharged power)

$P_{EV}(t)$: the charged power [kW] of the on-vehicle battery 106 (a negative value indicates discharged power)

$Q_D(t)$: hot water demand [kcal/h]

$Q_{FC}(t)$: exhaust heat amount [kcal/h] of the FC main body 220

$Q_{ST}(t)$: hot water supply amount [kcal/h] from the hot water tank 223

$Q_B(t)$: hot water supply amount [kcal/h] from the auxiliary boiler 221

$Q_H(t)$: heat generation amount [kcal/h] of the reverse flow prevention heater 222

$F(t)$: gas supply amount [kcal/h]

$F_{FC}(t)$: gas supply amount [kcal/h] to the FC main body 220

$F_B(t)$: gas supply amount [kcal/h] to the auxiliary boiler 221

$S(t)$: charged battery level [kWh] of the storage battery system $S_{BAT}(t)$: charged battery level [kWh] of the stationary storage battery 102

$S_{EV}(t)$: charged battery level [kWh] of the on-vehicle battery 106

$H(t)$: hot water reserve [kcal] of the hot water tank 223

The control target model 300g indicates the input/output relationship of each component, and the relationship between input or output variables of the components. For example, the control target model 300g can be represented by relations (14) to (23) below.

$$F(t)=F_{FC}(t)+F_B(t) \qquad (14)$$

$$P_{FC}(t)=aF_{FC}(t)+b \qquad (15)$$

$$Q_{FC}(t)=\alpha F_{FC}(t)+\beta \qquad (16)$$

a, b, α, β: coefficients determined based on the efficiency of the FC unit $$rH(t-1)+Q_{FC}(t)+Q_H(t)=H(t)+Q_{ST}(t) \qquad (17)$$

r: hot water storage efficiency $$H_{min} \leq H(t) \leq H_{max} \qquad (18)$$

$H_{min}$, $H_{max}$: capacity limits of the hot water tank 223

$$P_C(t)+P_{PV}(t)+P_{FC}(t)+P_{SB}(t) \leq P_D(t)+P_H(t) \qquad (19)$$

$$P_{FC}(t)+P_{SB}(t) \leq P_D(t)+P_H(t) \qquad (20)$$

where $P_{SB}(t)=P_{BAT}(t)+P_{EV}(t)$ $$P_H(t) \leq P_{FC}(t) \qquad (21)$$

$$S_{min} \leq S(t) \leq S_{max} \qquad (22)$$

$S_{min}$, $S_{max}$: capacity limits of the storage battery system $$-P_{FC\_DOWN} \leq P_{FC}(t)-P_{FC}(t-1) \leq P_{FC\_UP} \qquad (23)$$

$P_{FC\_UP}$ [kW/h]: upper limit of power generation amount increase rate of the FC unit 103

$P_{FC\_DOWN}$ [kW/h]: upper limit of power generation amount decrease rate of the FC unit 103

The storage battery system (the storage battery 102 and the on-vehicle battery 106) can be formed into a model in which the charged battery level S(t) increases or decreases according to the charged/discharged power $P_{SB}(t)$. More specifically, in the second embodiment, the storage battery 102 and the on-vehicle battery 106 are individually modeled, as shown in table 2.

Relation (22) indicates the constraint for the capacity of the storage battery system (the sum of the capacity of the storage battery 102 and the capacity of the on-vehicle battery 106).

Based on the result of optimal scheduling, the control unit 300d transmits, to the home gateway 7 in the home 100, the charge/discharge schedule of the storage battery 102, the charge/discharge schedule of the on-vehicle battery 106, and/or the operation and stop instructions and output target values for power generation of the FC unit 103 at a predetermined time interval (for example, per hour).

A user interface 105a notifies the user of each schedule and various kinds of information received from the cloud 300 by displaying them together with a confirmation message. The user can select whether to execute the calculated schedule by selecting permission/prohibition for the confirmation message. The user can also request the cloud 300 to modify the schedule using the user interface 105a.

Moreover, the user can set information such as the expected use time zone, lowest charged battery level upon departure, and expected travel distance of the vehicle EV using the user interface 105a. The constraint of the operation of the vehicle EV is related to relation (22), and represented by equation (22)'.

Equation (22)' represents the charged battery level S(t) of the storage battery system as the sum of the charged battery level $S_{BAT}(t)$ of the storage battery 102 and the charged battery level $S_{EV}(t)$ of the on-vehicle battery 106. Furthermore, a capacity constraint is imposed on each of the charged battery levels $S_{BAT}(t)$ and $S_{EV}(t)$. That is, the condition that the charged battery level $S_{BAT}(t)$ falls within the range from a minimum value $S_{BAT\_min}$ (inclusive) to a maximum value $S_{BAT\_max}$ (inclusive) is imposed. The condition that the charged battery level $S_{EV}(t)$ falls within the range from a minimum value $S_{EV\_min}$ (inclusive) to a maximum value $S_{EV\_max}$ (inclusive) is imposed.

$$S(t)=S_{BAT}(t)+S_{EV}(t)$$

$$S_{BAT\_min} \leq S_{BAT}(t) \leq S_{BAT\_max}$$

$$S_{EV\_min} \leq S_{EV}(t) \leq S_{EV\_max} \qquad (22)'$$

Note that at the use start time of the vehicle EV, $S_{EV}$ needs to be equal to or larger than the set minimum charged battery level. At the use end time of the vehicle EV, $S_{EV}$ decreases by an amount corresponding to the travel distance.

Under the above constraints, the calculation unit 300c (FIG. 9 or 10) calculates the schedule of the power generation amount $P_{FC}(t)$ of the FC unit 103 and the schedule of the charged/discharged power $P_{SB}(t)$ of the storage battery system (including the storage battery 102 and the on-vehicle battery 106) for minimizing the heat/electricity balance (energy cost) based on the power demand, hot water demand, PV power generation amount, unit prices of electricity and gas, and sales price of power. As the optimization algorithm, for example, a genetic algorithm is usable.

When each schedule is calculated, the same processing procedure as that shown in FIG. 5 is executed. After each schedule is presented to the user and approved (permitted), control of the FC unit 103 and the storage battery system is executed.

FIG. 12 is a schematic view showing an example of the gene design of a genetic algorithm according to the second embodiment. The same reference numerals as in FIG. 6 denote the same parts in FIG. 12. In the second embodiment, the power generation amount $P_{FC}(t)$ of the FC unit 103, the charged/discharged power $P_{SB}(t)$ of the storage battery 102, and the charged/discharged power $P_{EV}(t)$ of the on-vehicle battery 106 are incorporated in a gene. The operation schedule of the storage battery 102, the on-vehicle battery 106, and the FC unit 103 for one day is an individual. Generation data includes a plurality of individuals.

Equation (24) represents a fitness Fit to be maximized. It is possible to calculate an operation schedule by optimizing the fitness Fit as an objective function, as in the first embodiment. Equation (25) represents a heat/electricity balance C. Equation (26) represents a cost $g(P_{FC}, P_{SB})$ incurred by the discontinuity of a device operation. The total of heat/electricity balances C from t=0 to t=23 corresponds to the sum for 24 hours.

$$\text{Fit} = \frac{1}{f(C) + g(P_{FC}, P_{SB})} \quad (24)$$

$f(c)$: monotonically increasing function including $C$ as a variable $(f(c) > 0)$ $$C = \sum_{t=0}^{23} (c_F F(t) + c_E(t) P_C(t)) \quad (25)$$

$$c_E(t): \begin{cases} \text{unit price of electricity}(\yen/\text{kWh}) & P_C(t) > 0 \\ \text{PV sales price}(\yen/\text{kWh}) & P_C(t) \le 0 \end{cases}$$

$c_F$: unit price of gas($\yen$/kcal)

$$g(P_{FC}, P_{SB}) = w_1 |P_{FC}(t) - P_{FC}(t-1)| + w_2 |P_{SB}(t) - P_{SB}(t-1)| \quad (26)$$

$w_1, w_2$: weights

For the same reason as in the first embodiment, the fitness Fit represented by equation (24) is the reciprocal of the sum of the monotone increasing function $f(C) > 0$ and the cost $g(P_{FC}, P_{SB}) > 0$. A maximum fitness Fit is calculated by setting values for the power demand, hot water demand, PV power generation amount, unit price of electricity, unit price of gas, and PV sales price to equations (24) to (26), and executing optimization processing using a genetic algorithm. With this operation, it is possible to obtain a series of the power generation amount $P_{FC}(t)$ of the FC unit 103 and the charged/discharged power $P_{SB}(t)$ of the storage battery system, that is, $P_{BAT}(t)$ and $P_{EV}(t)$, which minimizes the heat/electricity balance C.

As described above, in the second embodiment, optimization calculation for minimizing an evaluation function under preset constraints is executed based on the estimated values including the PV power generation amount, power demand, and hot water demand. Especially, in the second embodiment, the storage battery system including the storage battery 102 and the on-vehicle battery 106 is to undergo optimization calculation. The operation schedule of the FC unit 103, the charge/discharge schedule of the storage battery 102, and the charge/discharge schedule of the on-vehicle battery 106, which can minimize the energy cost (heat/electricity cost) of the home 100, are thus calculated. It is, therefore, possible to reduce the heat/electricity cost without wastefully operating the reverse flow prevention heater 222.

When the storage battery 102 and the on-vehicle battery 106 are fully charged, dump power is converted into heat or the like and then discarded, resulting in wasted energy and extra cost (gas rate or the like). According to the second embodiment, it is possible to avoid such situation.

In the second embodiment, the same processing procedure as that shown in FIG. 5 is executed. By combining the estimation procedure of step S1-2 and the optimal scheduling of step S1-3, it is possible to create an energy demand-supply schedule such as the power generation schedule of the FC unit, the charge/discharge schedule of the storage battery 102 and the charge/discharge schedule of the on-vehicle battery 106 according to power demand estimation, hot water demand estimation, PV power generation estimation for a period of time such as about one day in consideration of the overall balance.

Therefore, this can avoid a case in which it is impossible to store the dump power of the FC unit 103 because both the storage battery 102 and the on-vehicle battery 106 have been fully charged, or a case in which the storage battery 102 and the on-vehicle battery 106 cannot be discharged when it is desirable to supply power by itself because their charged battery levels are short.

As described above, according to the second embodiment, it is possible to effectively use the on-vehicle battery, in addition to the same effect as that obtained in the first embodiment. It is, therefore, possible to effectively use dump power which cannot reversely flow to the commercial power grid without wasting it. Consequently, according to the second embodiment, an energy management system, server, energy management method, and storage medium, which can prevent energy from being wasted, can be provided.

[Third Embodiment]

Figure 13:
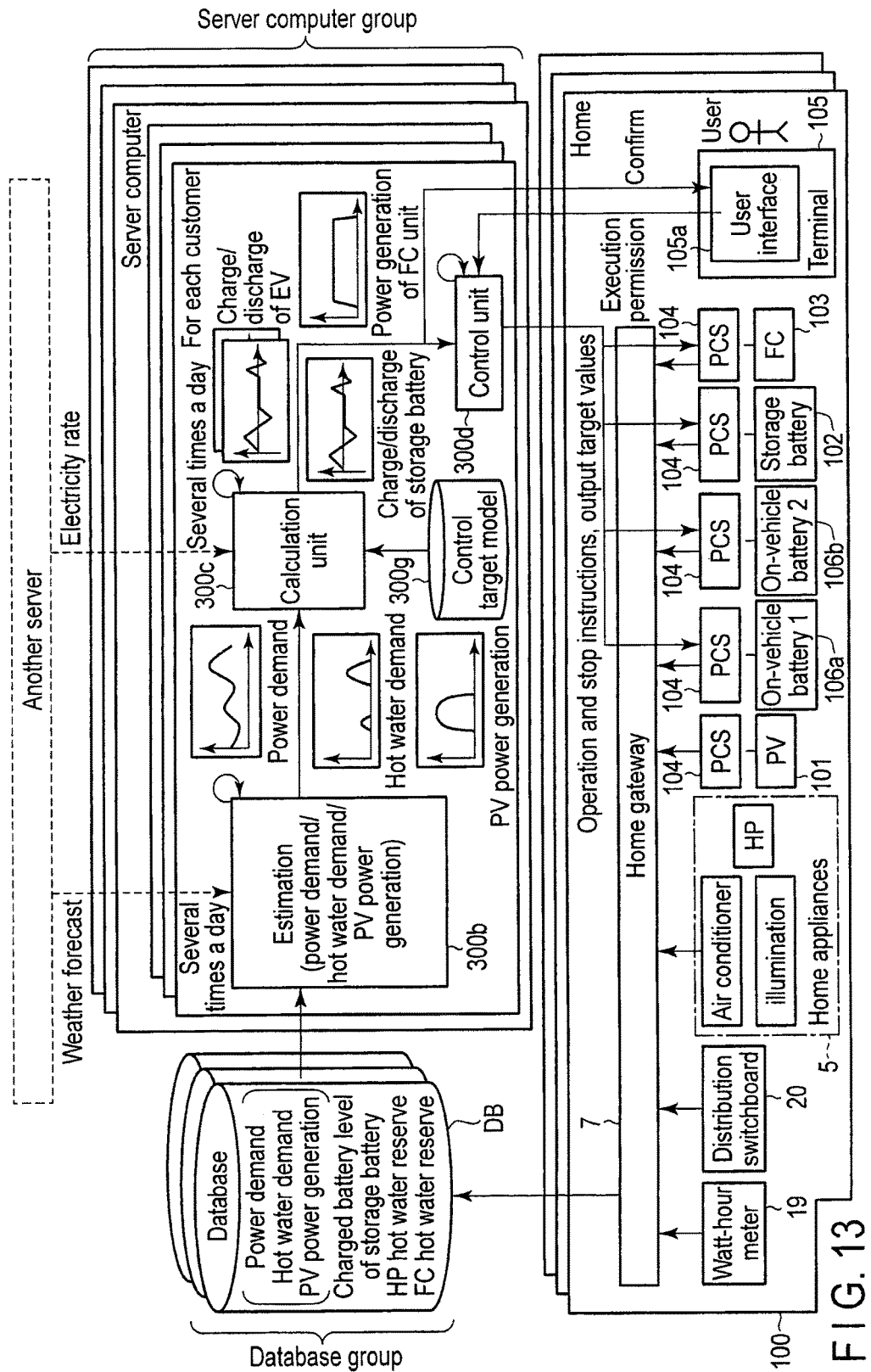
FIG. 13 is a functional block diagram showing the main part of a cloud computing system 300 and HEMS according to the third embodiment.

FIG. 13 is a functional block diagram showing the main part of a HEMS according to the third embodiment. The same reference numerals as in FIG. 10 denote the same parts in FIG. 13, and only different parts will be described here.

In the third embodiment, assume that a plurality of vehicles EV are connected to a distribution line 21 in a home 100. FIG. 13 shows the on-vehicle batteries (denoted by reference numerals 106a and 106b) of two vehicles EV. Reference symbols EV1 and EV2 distinguishably denote the vehicles EV. A calculation unit 300c calculates the operation schedules of the on-vehicle batteries 106a and 106b under overall constraints including a storage battery 102 and other electrical equipment.

Figure 14:
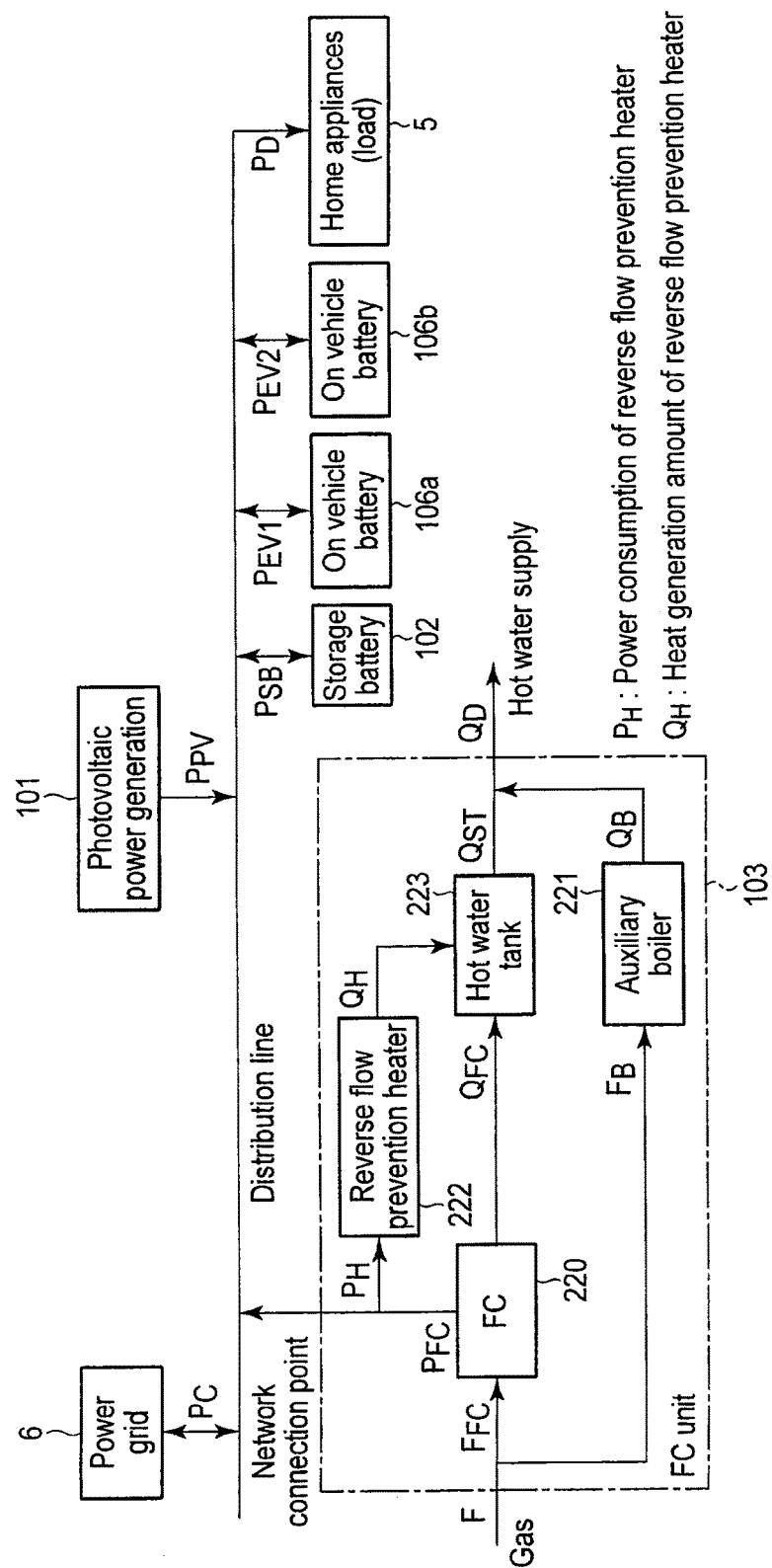
FIG. 14 is a block diagram for explaining a control target model 300g according to the third embodiment.

FIG. 14 is a block diagram for explaining a control target model 300g according to the third embodiment. In the third embodiment, a charged battery level $S_{EV1}(t)$ of the on-vehicle battery 106a and a charged battery level $S_{EV2}(t)$ of the on-vehicle battery 106b are incorporated in the control target model 300g.

FIG. 15 is a schematic view showing an example of gene design according to the third embodiment. In the third embodiment, the number of elements characterizing an individual increases as the number of on-vehicle batteries increases, as compared with the second embodiment. Therefore, genes diversify. According to the third embodiment, an increase in capacity of a storage battery system can not only prolong a power supply time in case of a power failure but also interchange power between the two vehicles EV in a normal state. According to the third embodiment, therefore, it is possible to improve the flexibility of the system operation, in addition to the effect obtained in the second embodiment.

[Fourth Embodiment]

Figure 16:
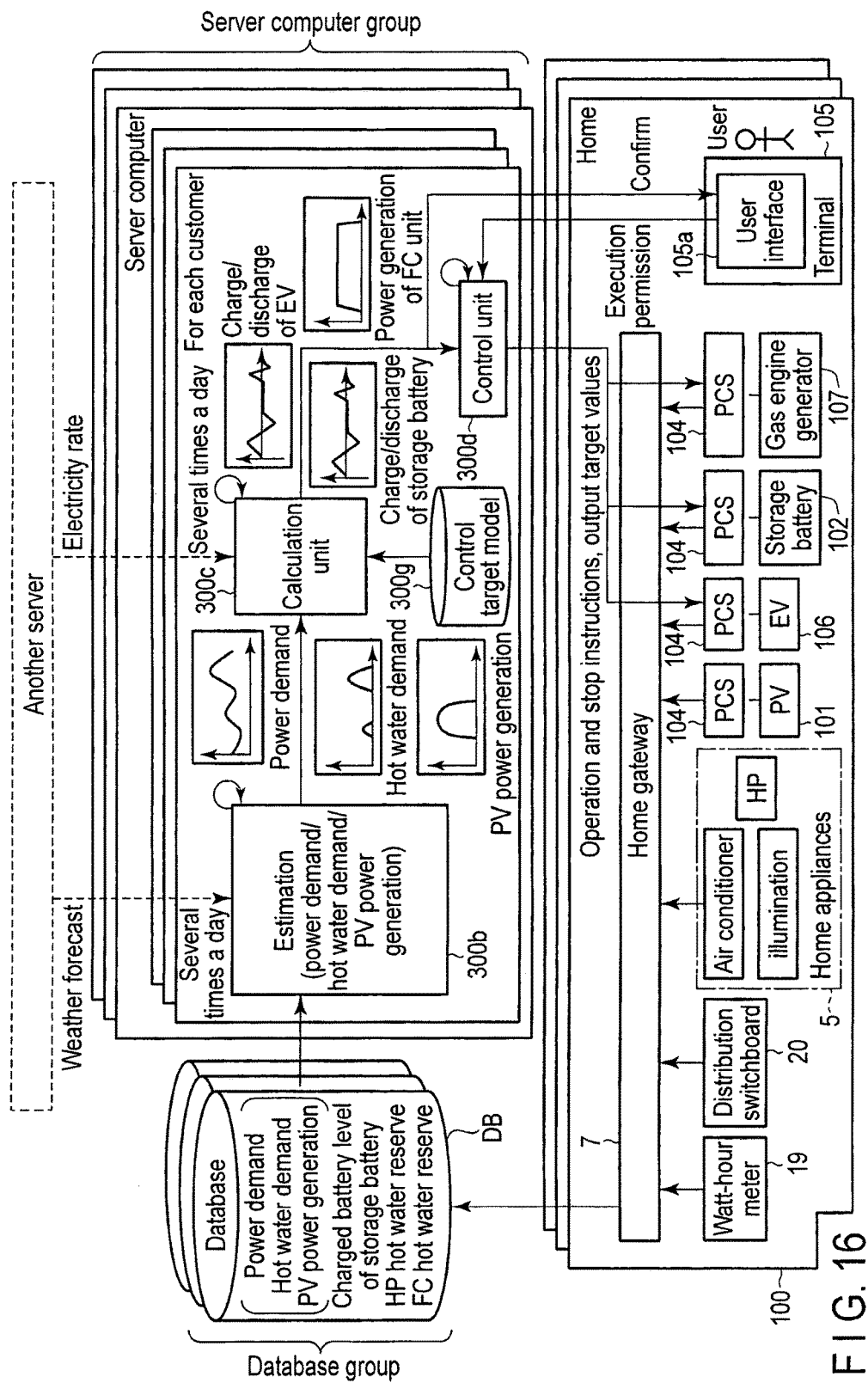
FIG. 16 is a functional block diagram showing the main part of a cloud computing system 300 and HEMS according to the fourth embodiment.

FIG. 16 is a functional block diagram showing the main part of a HEMS according to the fourth embodiment. The same reference numerals as in FIG. 13 denote the same parts in FIG. 16, and only different parts will be described here. In the fourth embodiment, a gas engine generator (to be referred to as a GE unit hereinafter) 107 adopting a motor is used as an energy generation apparatus instead of the FC unit 103.

Figure 17:
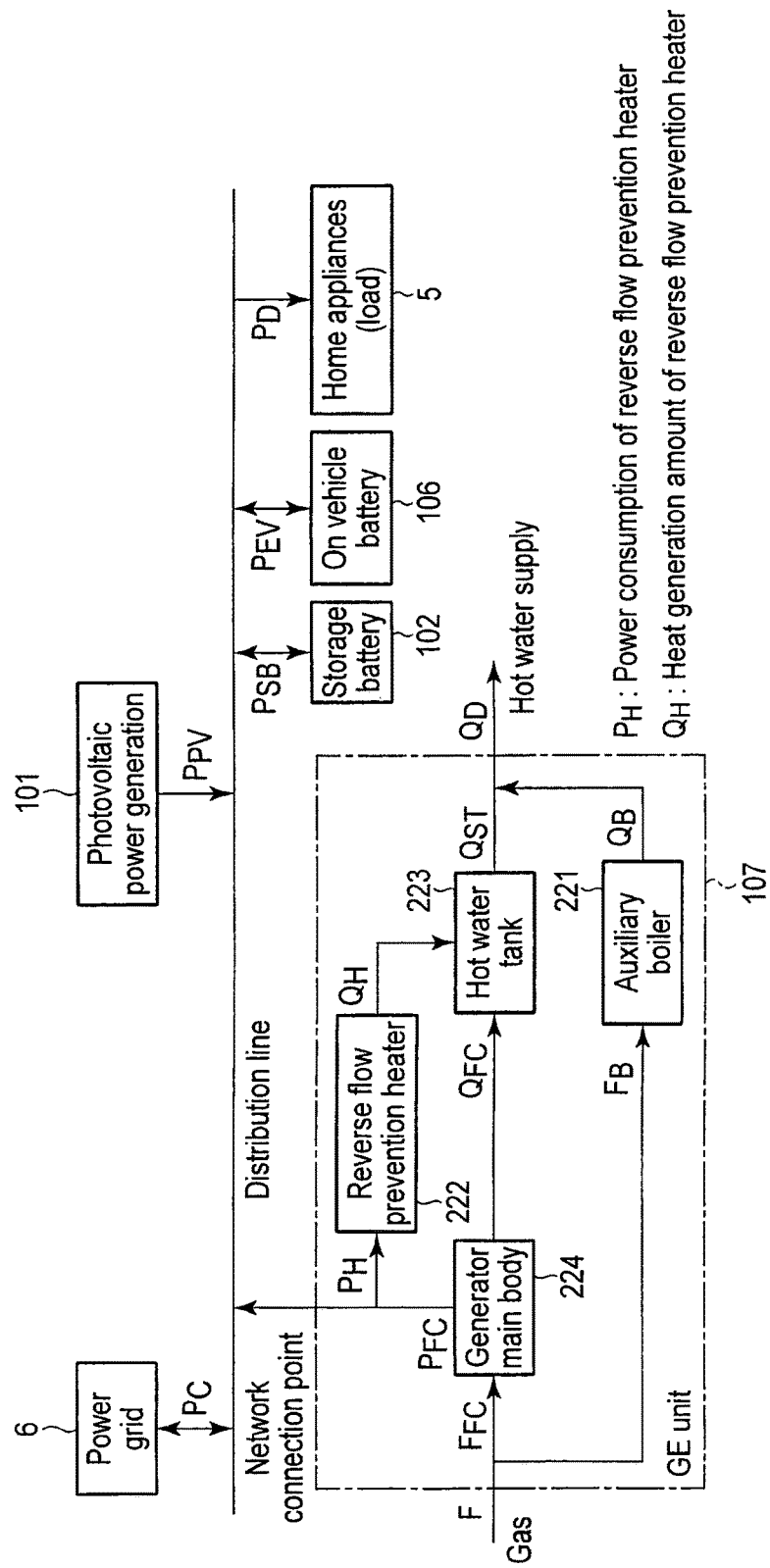
FIG. 17 is a block diagram for explaining a control target model 300g according to the fourth embodiment.

FIG. 17 is a block diagram for explaining a control target model 300g according to the fourth embodiment. As compared with FIG. 11, the FC main body 220 is replaced by a generator main body 224 and the FC unit 103 is replaced by the GE unit 107.

The gas engine generator is characterized by having a response speed higher than that of a fuel cell. That is, the time from when a power generation command is given until power is obtained is short. With this characteristic, it is possible to cover a shortage of power without exerting a large influence on an optimal schedule even if the power of an on-vehicle battery 106 is short when the user needs to unexpectedly go out by a vehicle EV. This is a characteristic unique to the usage of the gas engine generator. That is, according to the fourth embodiment, it is possible to create a system capable of flexibly coping with an unexpected situation, in addition to the effects obtained in the first to third embodiments.

Note that the present invention is not limited to the aforementioned embodiments. For example, a case in which a genetic algorithm is used has been explained in the embodiments. However, a method of calculating an operation schedule is not limited to the genetic algorithm. It is possible to calculate an optimal operation schedule using other various algorithms.

A program for executing the energy management method according to each of the first to fourth embodiments may be supplied from a storage medium such as a memory card or optical disk (including a CD-R and DVD-R) to the server computer SV. This type of storage medium is a computer-readable storage medium which stores a program executed by a computer. The program may be supplied to the server computer SV via a communication line such as the Internet or wireless communication.

Figure 18:
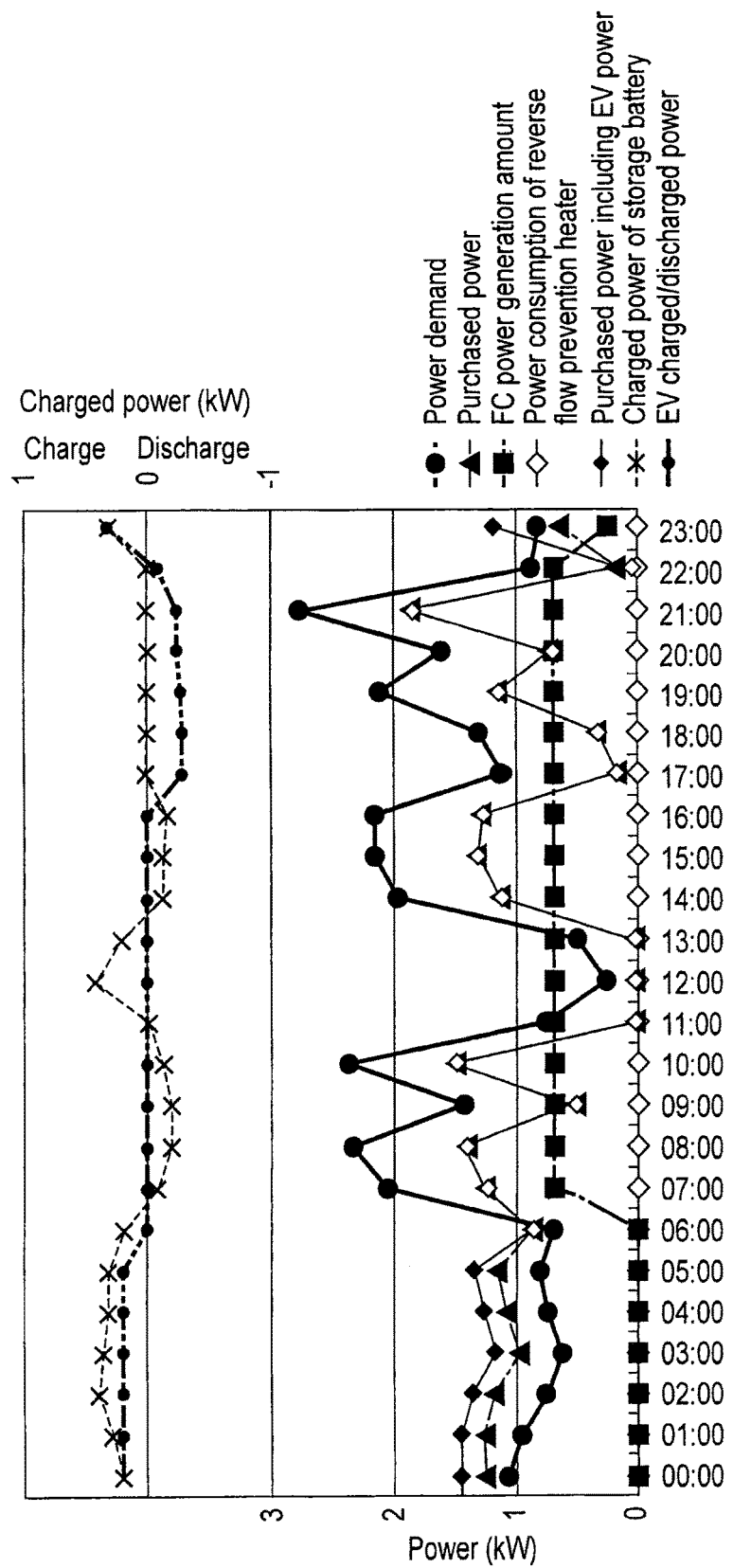
FIG. 18 is a view for explaining another effect obtained in the embodiment.
Figure 19:
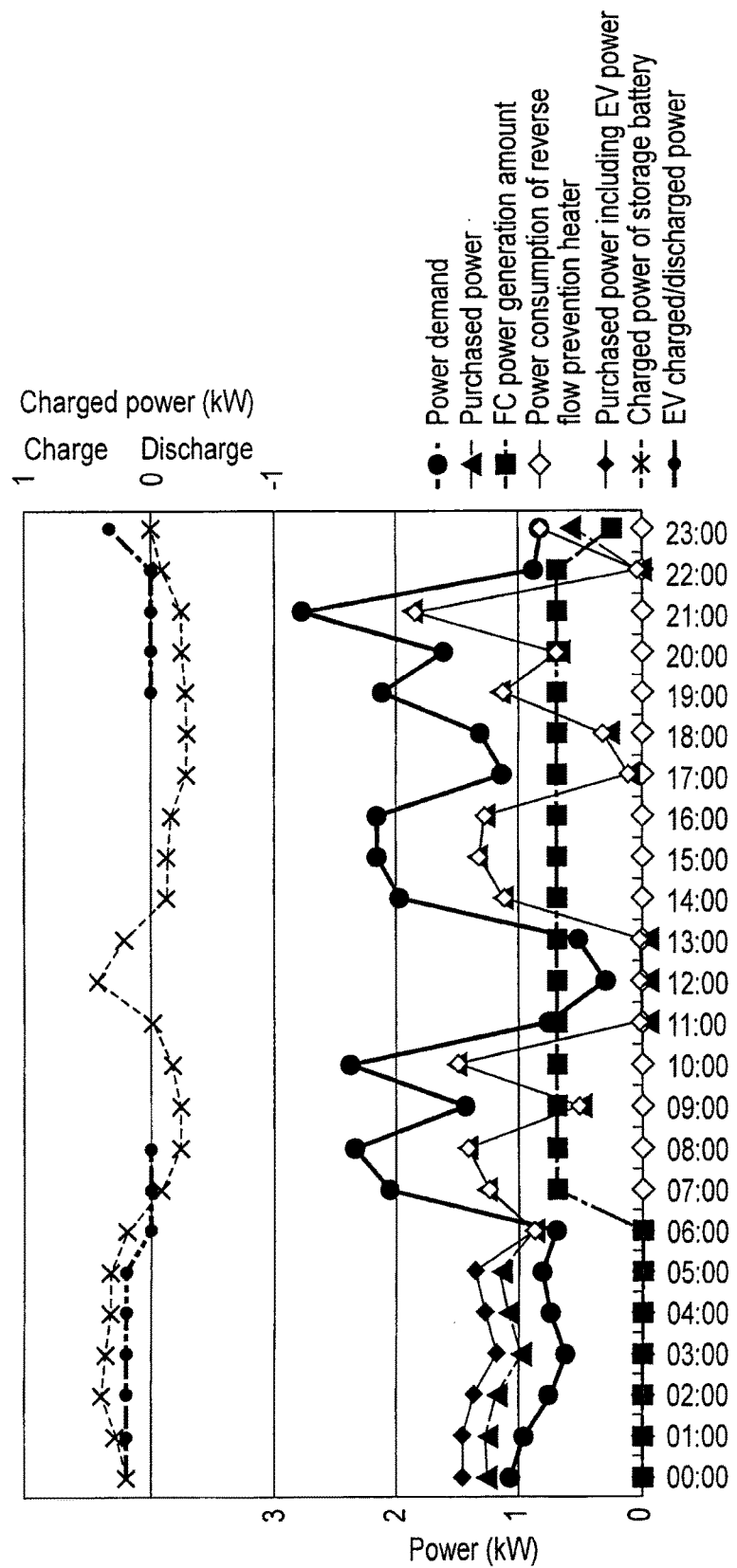
FIG. 19 is a view for explaining still another effect obtained in the embodiment.

The operation schedule of the electrical equipment is not limited to the graph shown in FIG. 8, and graphs of various patterns can be calculated. FIGS. 18 and 19 are graphs each showing another example of the operation pattern of the electrical equipment. Each of FIGS. 18 and 19 shows an example of a graph calculated by considering that the vehicle EV exists and its on-vehicle battery is usable. That is, a purchased power amount is calculated in consideration of the charged/discharged power and the capacity of the on-vehicle battery.

FIG. 18 is a graph created by assuming that the vehicle EV is at home all day. That is, the graph is created by assuming that the on-vehicle battery is connected to a distribution line 21 all day.

It is apparent from the graph showing the charged power of the storage battery and the graph showing the charged/discharged power of the vehicle EV that power is supplied from a storage battery 102 during a time zone in the morning (7:00 to 11:00) and power is supplied from the on-vehicle battery 106 during night hours (17:00 to 22:00). It is also apparent that the storage battery 102 and the on-vehicle battery 106 are charged during a time zone from late night to the early morning (22:00 to 5:00).

FIG. 19 is a graph created by assuming that the vehicle EV was used during the day. That is, the graph is created by assuming that the on-vehicle battery is disconnected from the distribution line 21. During a time zone (8:00 to 19:00) when the vehicle EV is used for a ride and thus the on-vehicle battery 106 cannot be used, home appliances 5 have no other choice but to operate using only power from the storage battery 102. When, however, the vehicle EV returns and the on-vehicle battery is connected to the distribution line 21 again, the operation schedule is immediately recalculated. It is apparent from the graph shown in FIG. 19 that the on-vehicle battery 106 is charged during the night (22:00 to 6:00).

In the graphs shown in FIGS. 18 and 19, the power consumption of a reverse flow prevention heater 222 remains 0. It is therefore apparent that no power is wasted.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An energy management system including a client, and a server capable of communicating with the client, wherein the server comprises
    a collector configured to acquire data concerning electrical equipment in a house including a storage battery and a fuel cell from the client,
    an estimator configured to estimate an energy demand and an energy generation amount in the house based on the data,
    a calculator configured to calculate, based on the energy demand and the energy generation amount, an operation schedule of the electrical equipment to optimize an energy balance in the house under a constraint that minimizes dump power to be discarded after the storage battery is fully charged and when a reverse flow of generated power of the fuel cell to a grid is prohibited, and
    a controller configured to create control information to control the electrical equipment based on the calculated operation schedule, wherein
    the energy management system further comprising a database configured to store a control target model of the electrical equipment,
    the calculator calculates the operation schedule based on the control target model,
    the fuel cell includes a main body, an auxiliary boiler, a reverse flow prevention heater, and a hot water tank,
    the control target model includes a grid, the storage battery, the main body, the auxiliary boiler, the reverse flow prevention heater, and the hot water tank, and
    the calculator calculates the operation schedule by optimizing an objective function including variates concerning the grid, the storage battery, the main body, the auxiliary boiler, the reverse flow prevention heater, and the hot water tank.

2. The energy management system of claim 1, wherein the storage battery includes a stationary storage battery installed in the house, and an on-vehicle battery electrically connectable to the stationary storage battery.

3. The energy management system of claim 1, wherein the objective function includes a unit price of electricity, a unit price of gas, and a sales price of power as variables.

4. The energy management system of claim 1, wherein the calculator optimizes the objective function using a genetic algorithm.

5. The energy management system of claim 1, wherein the calculator calculates the operation schedule under a constraint that limits a rate of change in power generation amount of the fuel cell as a function of time to a predetermined range.

6. The energy management system of claim 1, wherein the electrical equipment includes a generator adopting a motor.

7. The energy management system of claim 1, wherein the client includes a user interface configured to reflect an intention of a customer of the power on the control information transmitted from the controller.

8. The energy management system of claim 1, wherein at least one of the collector, the estimator, the calculator, and the controller is a functional object arranged in a cloud computing system.

9. A server for managing energy in a house including electrical equipment having a storage battery and a fuel cell, comprising:
    a collector configured to acquire data concerning the electrical equipment;
    an estimator configured to estimate an energy demand and an energy generation amount in the house based on the data;
    a calculator configured to calculate, based on the energy demand and the energy generation amount, an operation schedule of the electrical equipment to optimize an energy balance in the house under a constraint that minimizes dump power to be discarded after the storage battery is fully charged and when a reverse flow of generated power of the fuel cell to a grid is prohibited; and
    a controller configured to create control information to control the electrical equipment based on the calculated operation schedule, wherein
    the server further comprising a database configured to store a control target model of the electrical equipment,
    the calculator calculates the operation schedule based on the control target model,
    the fuel cell includes a main body, an auxiliary boiler, a reverse flow prevention heater, and a hot water tank,
    the control target model includes a grid, the storage battery, the main body, the auxiliary boiler, the reverse flow prevention heater, and the hot water tank, and
    the calculator calculates the operation schedule by optimizing an objective function including variates concerning the grid, the storage battery, the main body, the auxiliary boiler, the reverse flow prevention heater, and the hot water tank.

10. The server of claim 9, wherein the storage battery includes a stationary storage battery installed in the house, and an on-vehicle battery electrically connectable to the stationary storage battery.

11. The server of claim 9, wherein the objective function includes a unit price of electricity, a unit price of gas, and a sales price of power as variables.

12. The server of claim 9, wherein the calculator optimizes the objective function using a genetic algorithm.

13. The server of claim 9, wherein
    the calculator calculates the operation schedule under a constraint that limits a rate of change in power generation amount of the fuel cell as a function of time to a predetermined range.

14. An energy management method applicable to an energy management system including a client, and a server capable of communicating with the client, the method comprising:
    by the server,
    acquiring data concerning electrical equipment in a house including a storage battery and a fuel cell from the client;
    estimating an energy demand and an energy generation amount in the house based on the data;
    calculating, based on the energy demand and the energy generation amount, an operation schedule of the electrical equipment to optimize an energy balance in the house under a constraint that minimizes dump power to be discarded after the storage battery is fully charged and when a reverse flow of generated power of the fuel cell to a grid is prohibited; and
    creating control information to control the electrical equipment based on the calculated operation schedule, wherein
    in the calculating, the operation schedule is calculated based on a control target model of the electrical equipment,
    the fuel cell includes a main body, an auxiliary boiler, a reverse flow prevention heater, and a hot water tank,
    the control target model includes a grid, the storage battery, the main body, the auxiliary boiler, the reverse flow prevention heater, and the hot water tank, and
    in the calculating, the operation schedule is calculated by optimizing an objective function including variates concerning the grid, the storage battery, the main body, the auxiliary boiler, the reverse flow prevention heater, and the hot water tank.

15. The energy management method of claim 14, wherein the storage battery includes a stationary storage battery installed in the house, and an on-vehicle battery electrically connectable to the stationary storage battery.

16. The energy management method of claim 14, wherein the objective function includes a unit price of electricity, a unit price of gas, and a sales price of power as variables.

17. The energy management method of claim 14, wherein in the calculating, the objective function is optimized using a genetic algorithm.

18. The energy management method of claim 14, wherein in the calculating, the operation schedule is calculated under a constraint that limits a rate of change in power generation amount of the fuel cell as a function of time to a predetermined range.

19. A non-transitory computer-readable storage medium storing a program to be executed by a computer, wherein the program comprises a command to cause the computer to execute an energy management method, the method comprising:
    acquiring data concerning electrical equipment in a house including a storage battery and a fuel cell from the client;
    estimating an energy demand and an energy generation amount in the house based on the data;
    calculating, based on the energy demand and the energy generation amount, an operation schedule of the electrical equipment to optimize an energy balance in the house under a constraint that minimizes dump power to be discarded after the storage battery is fully charged and when a reverse flow of generated power of the fuel cell to a grid is prohibited; and
    creating control information to control the electrical equipment based on the calculated operation schedule, wherein
    in the calculating, the operation schedule is calculated based on a control target model of the electrical equipment, the fuel cell includes a main body, an auxiliary boiler, a reverse flow prevention heater, and a hot water tank, the control target model includes a grid, the storage battery, the main body, the auxiliary boiler, the reverse flow prevention heater, and the hot water tank, and in the calculating, the operation schedule is calculated by optimizing an objective function including variates concerning the grid, the storage battery, the main body, the auxiliary boiler, the reverse flow prevention heater, and the hot water tank.

* * * * *